United States Patent
Hestness et al.

(10) Patent No.: US 11,593,655 B2
(45) Date of Patent: Feb. 28, 2023

(54) PREDICTING DEEP LEARNING SCALING

(71) Applicant: Baidu USA, LLC, Sunnyvale, CA (US)

(72) Inventors: Joel Hestness, Mountain View, CA (US); Gregory Diamos, San Jose, CA (US); Hee Woo Jun, Sunnyvale, CA (US); Sharan Narang, Sunnyvale, CA (US); Newsha Ardalani, Santa Clara, CA (US); Md Mostofa Ali Patwary, Gilroy, CA (US); Yanqi Zhou, San Jose, CA (US)

(73) Assignee: Baidu USA LLC, Sunnyvale, CA (US)

(*) Notice: Subject to any disclaimer, the term of this patent is extended or adjusted under 35 U.S.C. 154(b) by 1029 days.

(21) Appl. No.: 16/206,910

(22) Filed: Nov. 30, 2018

(65) Prior Publication Data
US 2020/0175374 A1    Jun. 4, 2020

(51) Int. Cl.
*G06N 3/04*      (2006.01)
*G06N 3/08*      (2006.01)
*G06N 3/084*     (2023.01)

(52) U.S. Cl.
CPC ........... *G06N 3/084* (2013.01); *G06N 3/0472* (2013.01)

(58) Field of Classification Search
CPC ......................... G06N 3/0472; G06N 3/084
See application file for complete search history.

(56) References Cited

U.S. PATENT DOCUMENTS

| 2018/0018587 A1* | 1/2018 | Kobayashi | G06N 20/00 |
| 2019/0325307 A1* | 10/2019 | Li | G06N 3/08 |

OTHER PUBLICATIONS

Figueroa, Rosa L., et al. "Predicting sample size required for classification performance." BMC medical informatics and decision making 12.1 (2012): 1-10. (Year: 2012).*

Domhan, Tobias, Jost Tobias Springenberg, and Frank Hutter. "Speeding up automatic hyperparameter optimization of deep neural networks by extrapolation of learning curves." Twenty-fourth international joint conference on artificial intelligence. 2015. (Year: 2015).*

(Continued)

*Primary Examiner* — Hal Schnee
(74) *Attorney, Agent, or Firm* — North Weber & Baugh LLP

(57) ABSTRACT

As deep learning application domains grow, a deeper understanding of the relationships between training set size, computational scale, and model accuracy improvements is extremely beneficial. Presented herein are large-scale empirical study of error and model size growth as training sets grow. Embodiments of a methodology for this measurement are introduced herein as well as embodiments for predicting other metrics, such as compute-related metrics. It is shown herein that power-law may be used to represent deep model relationships, such as error and training data size. It is also shown that model size scales sublinearly with data size. These scaling relationships have significant implications on deep learning research, practice, and systems. They can assist model debugging, setting accuracy targets, and decisions about data set growth. They can also guide computing system design and underscore the importance of continued computational scaling.

20 Claims, 19 Drawing Sheets

(56) References Cited

OTHER PUBLICATIONS

Luong et al.,"Neural Machine Translation (seq2seq) Tutorial," [online], [Retrieved Sep. 20, 2019]. Retrieved from Internet <URL: https://github.com/tensorflow/nmt>, 2017. (19 pgs).
Luong et al.,"Effective approaches to attention-based neural machine translation," arXiv preprint arXiv:1508.04025, 2015. (11 pgs).
Russakovsky et al.,"ImageNet Large Scale Visual Recognition Challenge," arXiv preprint arXiv:1409.0575, 2015. (43 pgs).
Schwarze et al.,"Statistical Mechanics of Learning in a Large Committee Machine," In Neural Information Processing Systems, (NIPS), 1993.(8pgs).
Sennrich et al.,"Neural Machine Translation of Rare Words with Subword Units," arXivpreprint arXiv:1508.07909, 2016. (11 pgs).
Sennrich et al.,"Edinburgh Neural Machine Translation Systems for WMT 16," arXivpreprint arXiv:1606.02891, 2016. (6pgs).
Seung et al.,"Statistical Mechanics of Learning from Examples," Physical Review A, 45:6056-6091, Apr. 1992. (36 pgs).
Smith et al.,"A Bayesian Perspective on Generalization and Stochastic Gradient Descent," arXiv preprint arXiv:1710.06451, Nov. 2018. (13pgs).
Sun et al.,"Revisiting Unreasonable Effectiveness of Data in Deep Learn-ing Era," arXiv preprint arXiv:1707.02968, 2017. (13pgs).
Tucker et al.,"A Generalization of the Glivenko-Cantelli Theorem," The Annals of Mathematical Statistics, 30(3):828-830,1959. (3pgs).
Vapnik et al.,"An Overview of Statistical Learning Theory," In IEEE Transactions on Neural Networks, vol. 10,pp. 988-999,1998. (12 pgs).
Zhang et al.,"Understanding Deep Learning Requires Rethinking Generalization," arXiv preprint arXiv:1611.03530, 2017. (15pgs).
Zilly et al.,"Recurrent Highway Network," arXiv preprint arXiv:1607.03474, 2017. (12pgs).
Amari et al.,"Four Types of Learning Curves," Neural Computation, 4(4):605-618,1992. (15pgs).
G. Diamos "Deep Learning scaling is predictable," 2017, [online], [Retrieved Sep. 20, 2019]. Retrieved from Internet <URL: https://supercomputersfordl2017.github.io/Presentations/scaling-is-predictable.pdf> (35pgs).
"Deep Learning Scaling is Predictable, Empirically," Baidu Research, 2017, [online], [Retrieved Sep. 20, 2019]. Retrieved from Internet <URL: http://research.baidu.com/Blog/index-view?id=89> (3pgs).
Hestness et al.,"Deep Learning Scaling is Predictable, Empirically," arXiv preprint arXiv:1712.00409, 2017. (19 pgs).
Chelba et al.,"One BillionWord Benchmark for Measuring Progress in Statistical Language Modeling," arXiv preprint arXiv:1312.3005, 2013. (6 pgs).
Chorowski et al.,"Attention-based Models for Speech Recognition," arXiv preprint arXiv:1506.07503, 2015. (19pgs).
Collins et al.,"Capacity and Trainability in Recurrent Neural Networks," In Proceedings of The International Conference on Learning Representations (ICLR), 2017. (17pgs).
Dziugaite et al.,"Computing Nonvacuous Generalization Bounds for Deep (Stochastic) Neural Networks with Many More Parameters than Training Data," arXiv preprint arXiv:1703.11008, 2017. (14pgs).

Ehrenfeucht et al.,"A General Lower Bound on the Number of Examples Needed for Learning," Information and Computation, 82:247-261, 1989. Workshop on Computing Learning Theory, 1988. (16 pgs).
Graves et al.,"Connectionist Temporal Classification: Labelling Unsegmented Sequence Data with Recurrent Neural Networks," In Proceedings of the 23rd International Conference on Machine Learning (ICML), 2006. (8 pgs).
Györgyi et al.,"Statistical Theory of Learning a Rule," [online], [Retrieved Sep. 20, 2019]. Retrieved from Internet <URL: https://www.semanticscholar.org/paper/Statistical-theory-of-learning-a-rule-Gy%C3%B6rgyi-Tishby/98d3377b55450521e61e2ea72c9a6fd12f7ac639#paper-header>, 1990. (2 pgs).
Amari et al.,"A Universal Theorem on Learning Curves," Neural Networks, 6:161-166,1993, [online], [Retrieved Sep. 20, 2019]. Retrieved from Internet <URL: https://www.sciencedirect.com/science/article/pii/089360809390013M> (2pgs).
Amari et al.,"Statistical Theory of Learning Curves under Entropic Loss Criterion," Neural Computation, 5(1):140-153, 1993. (14pgs).
Amodei et al.,"Deep Speech 2: End-to-End Speech Recognition in English and Mandarin," arXiv preprint arXiv:1512.02595, 2015. (28 pgs).
Arpit et al.,"A Closer Look at Memorization in Deep Networks," arXiv preprint arXiv:706.05394, 2017. (10 pgs).
Bahdanau et al.,"End-to-end Attention-based Large Vocabulary Speech Recognition," arXiv preprint arXiv:1508.04395v2, 2016. (8 pgs).
Banko et al.,"Scaling to Very Very Large Corpora for Natural Language Disambiguation," In Proceedings of Association of Computational Linguistics (ACL), Jan. 2001. (8 pgs).
Bartlett et al.,"Rademacher and Gaussian Complexities: Risk Bounds and Structural Results," In Journal of Machine Learning Research 3, pp. 463-482, 2002. (20 pgs).
Battenberg et al.,"Exploring Neural Transducers for End-to-end Speech Recognition," arXiv preprint arXiv:1707.07413,2017. (8pgs).
Blumer et al.,"Learnability and the Vapnik-Chervonenkis Dimension," Journal of the ACM (JACM), 36(4):929-965,1989. (37pgs).
Hannun et al.,"Deep Speech: Scaling Up End-to-End Speech Recognition," arXiv preprint arXiv:1412.5567, 2014. (12pgs).
Harvey et al.,"Nearly-tight VC-dimension Bounds for Piecewise Linear Neural Networks," arXiv preprint arXiv:1703.02930, 2017. (16pgs).
Haussler et al.,"Quantifying Inductive Bias: AI Learning Algorithms and Valiant's Learning Framework," Artificial Intelligence, 36(2):177-221, 1988. (45pgs).
Haussler et al.,"Rigorous Learning Curve Bounds from Statistical Mechanics," Machine Learning, 25(2):195-236,1996. (12 pgs).
He et al.,"Deep Residual Learning for Image Recognition," arXiv preprint rXiv:1512.03385, 2015. (12pgs).
Jozefowicz et al.,"Exploring the Limits of Language Modeling," arXiv preprint arXiv:1602.02410, 2016. (11 pgs).
Kawaguchi et al.,"Generalization in Deep Learning," arXiv preprint arXiv:1710.05468, Oct. 2017. (31 pgs).
Klein et al.,"OpenNMT: Open-source toolkit for neural machine translation," arXiv preprint arXiv:1701.02810, 2017. (6pgs).
Koehn et al.,"Moses: Open Source Toolkit for Statistical Machine Translation," In Proceedings of the ACL, Demo & Poster Sessions, pp. 177-180 2007. (4pgs).

* cited by examiner

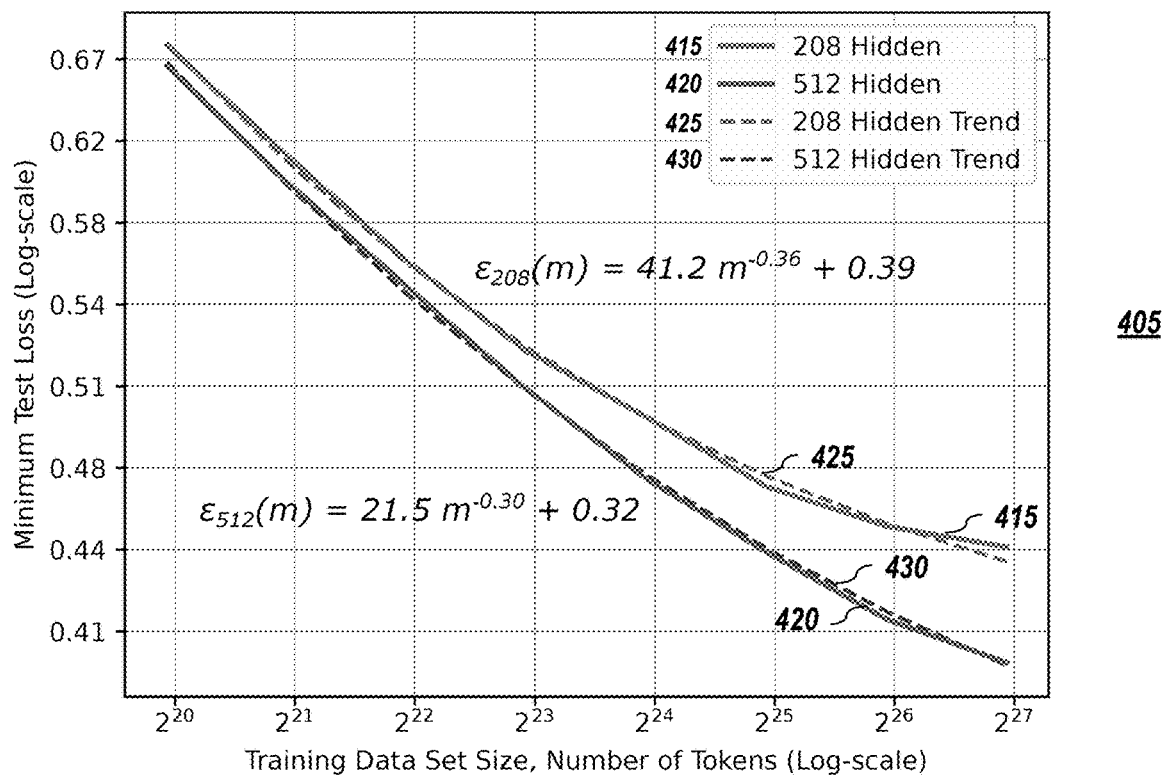
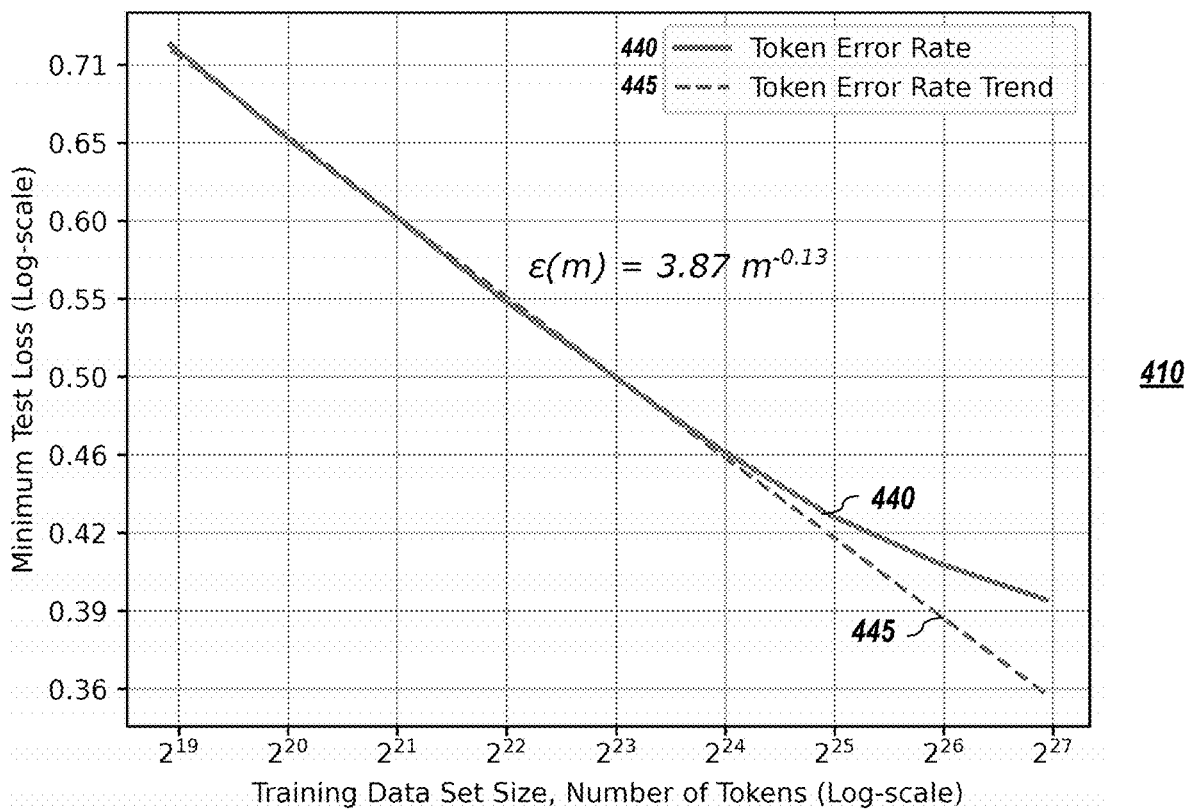
FIG. 4

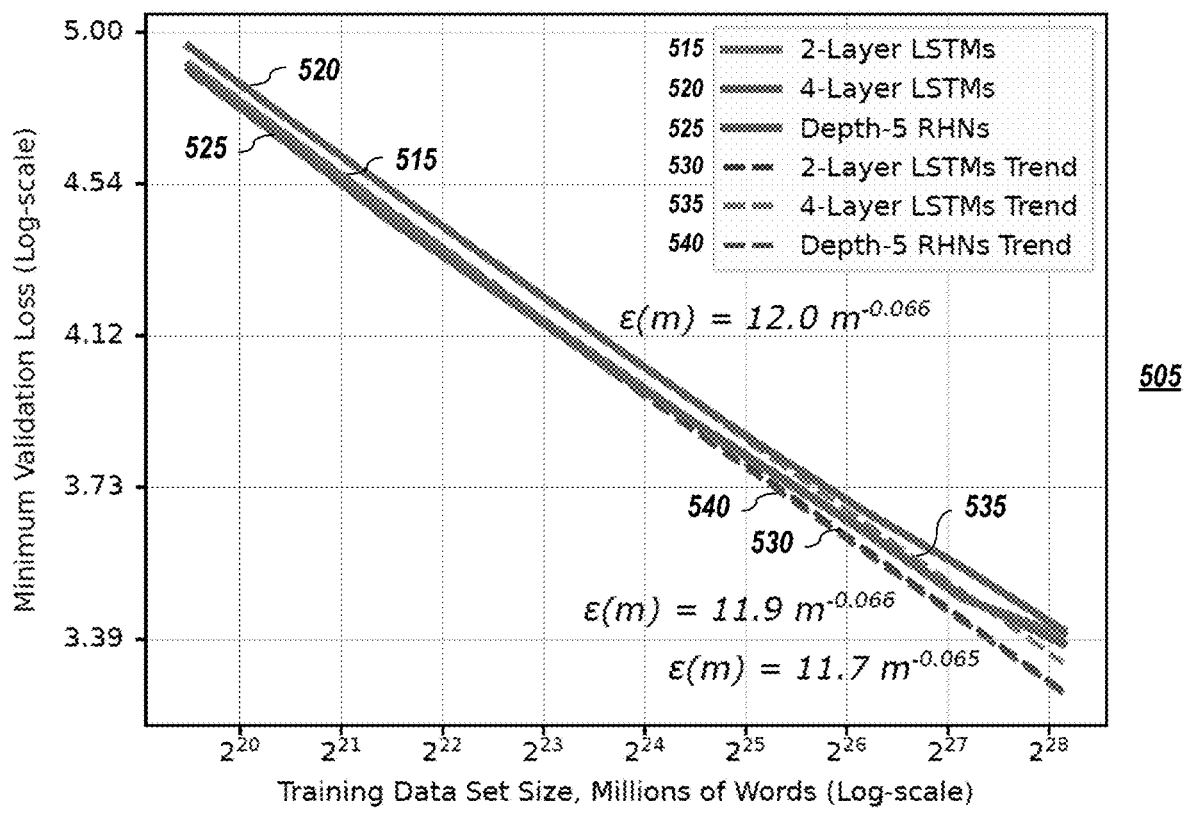
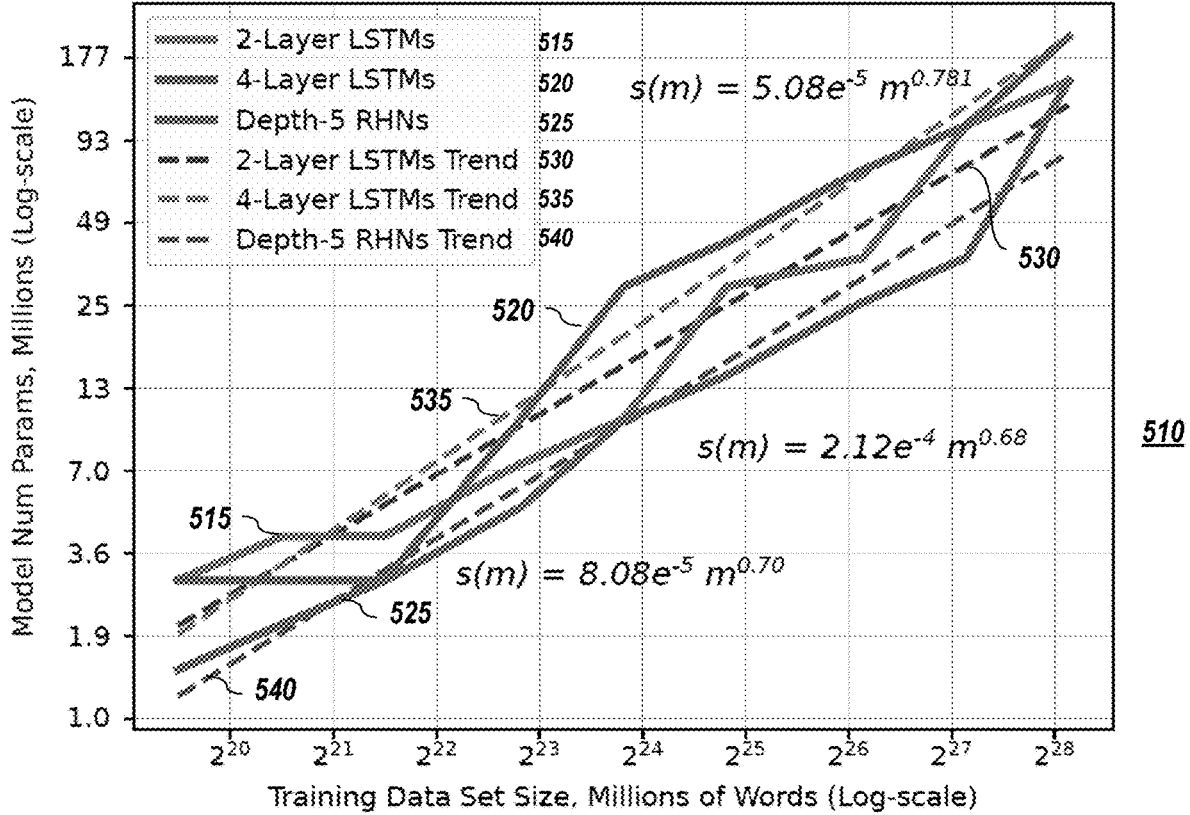
FIG. 5

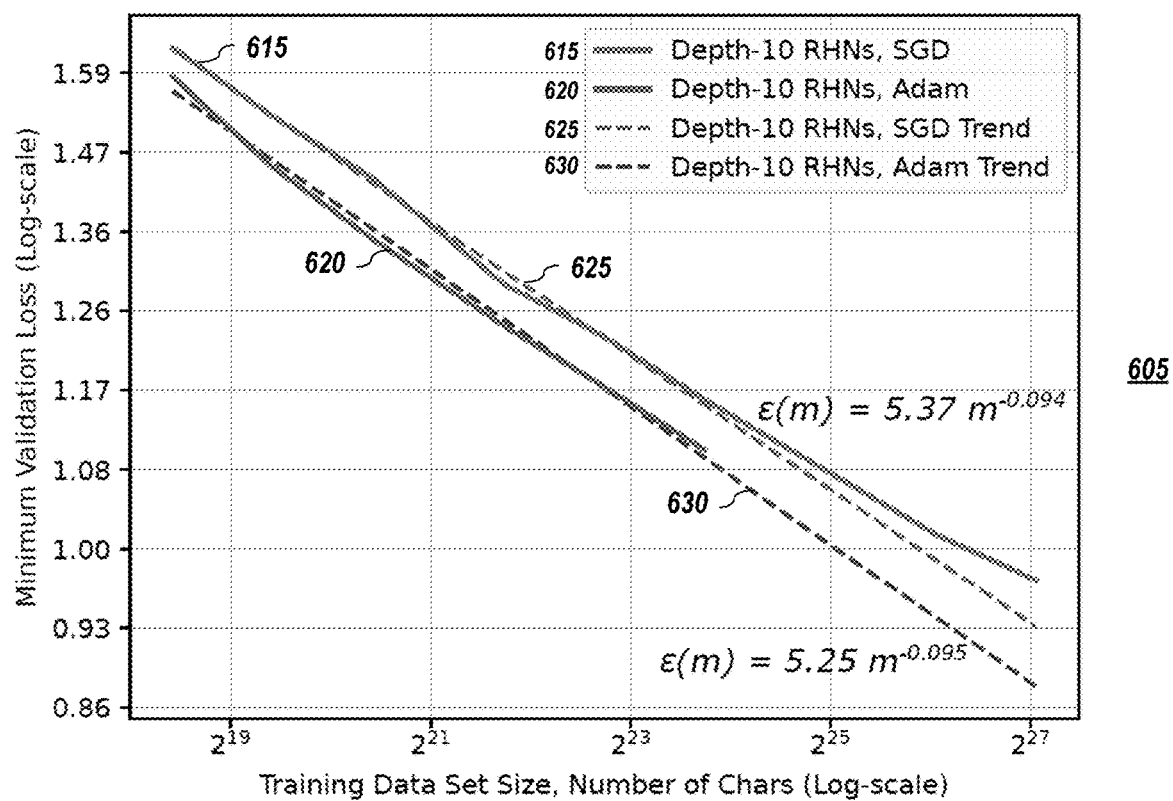
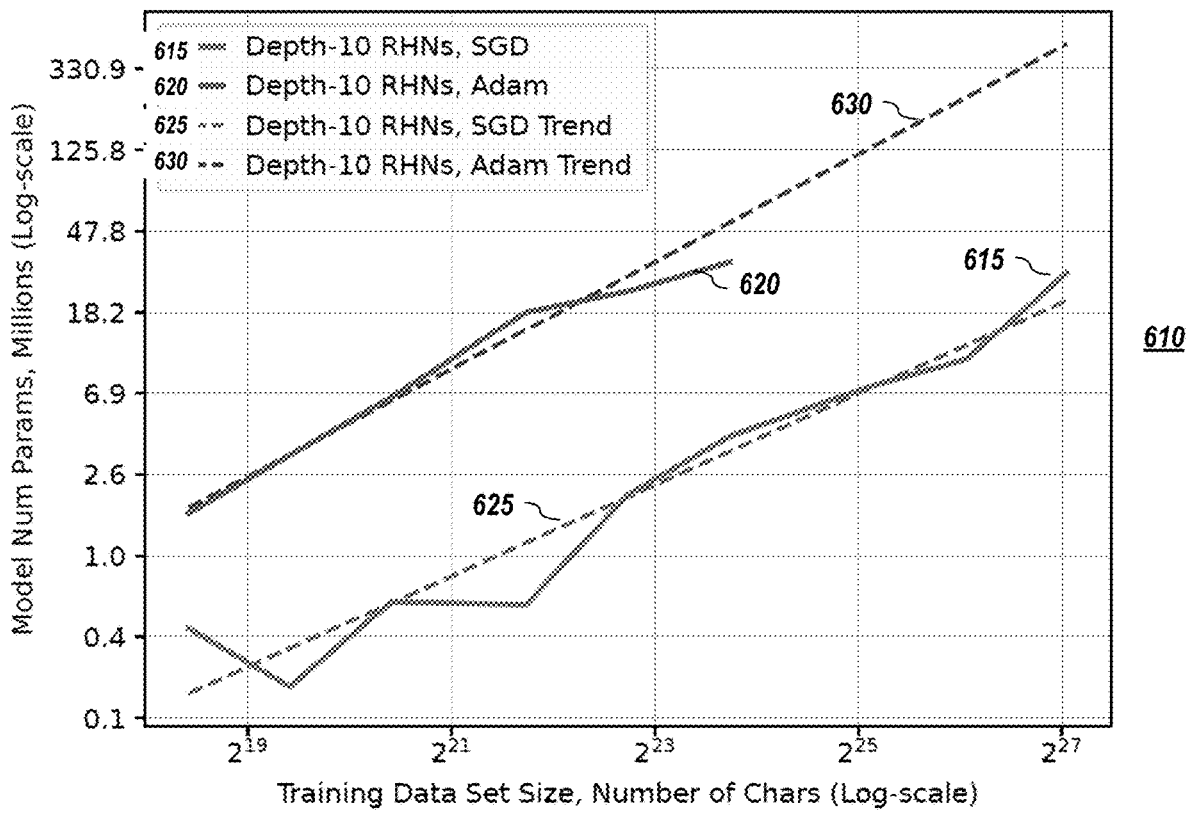
FIG. 6

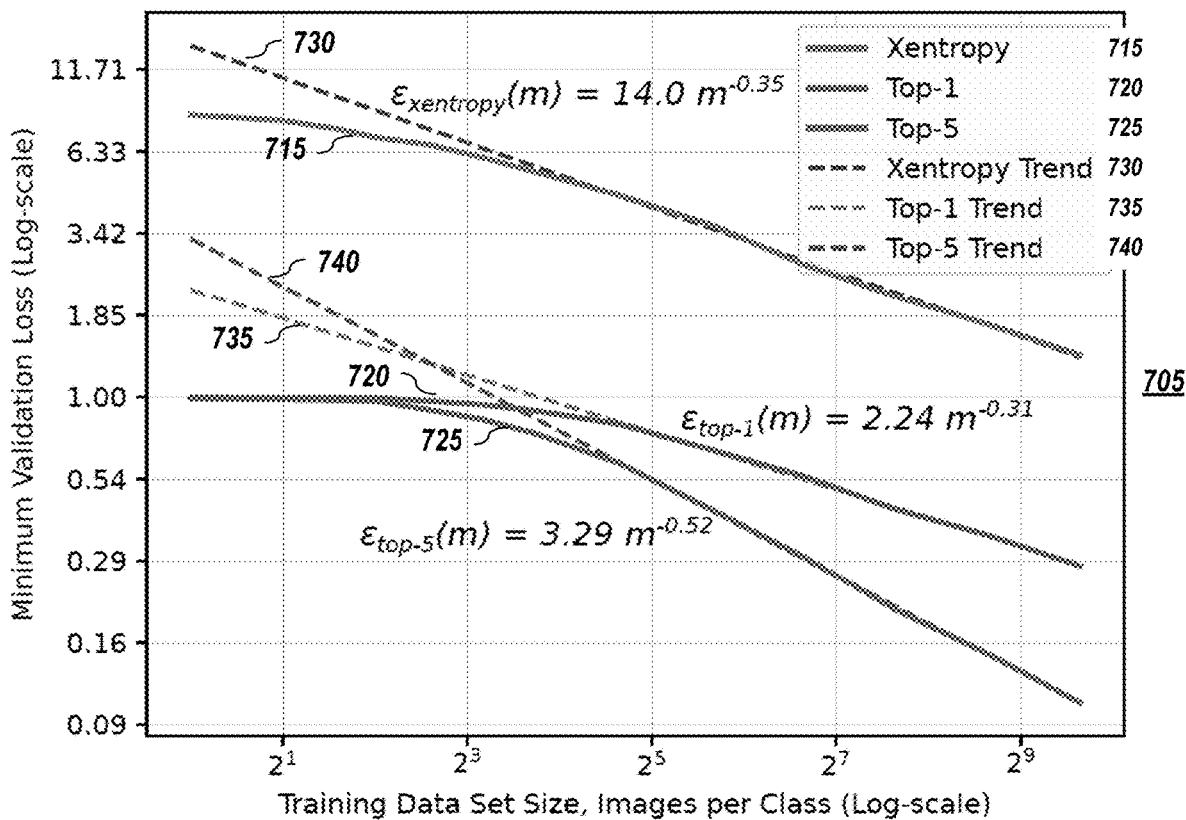
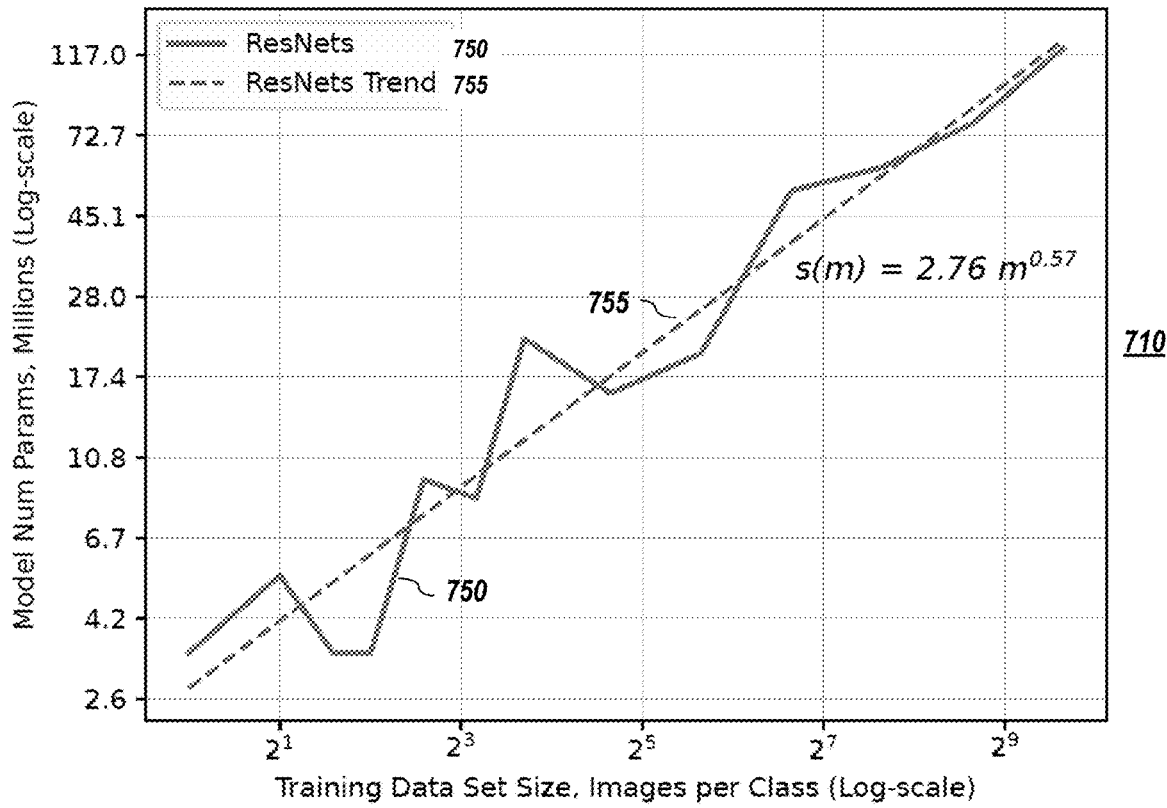
FIG. 7

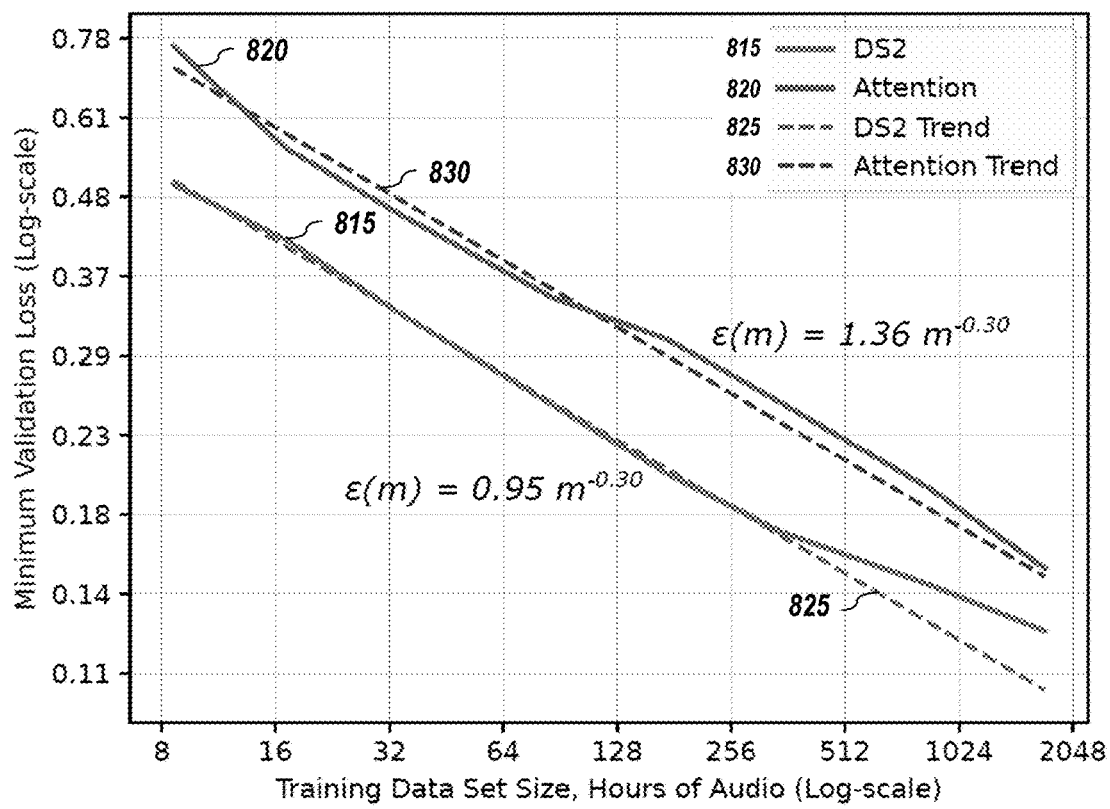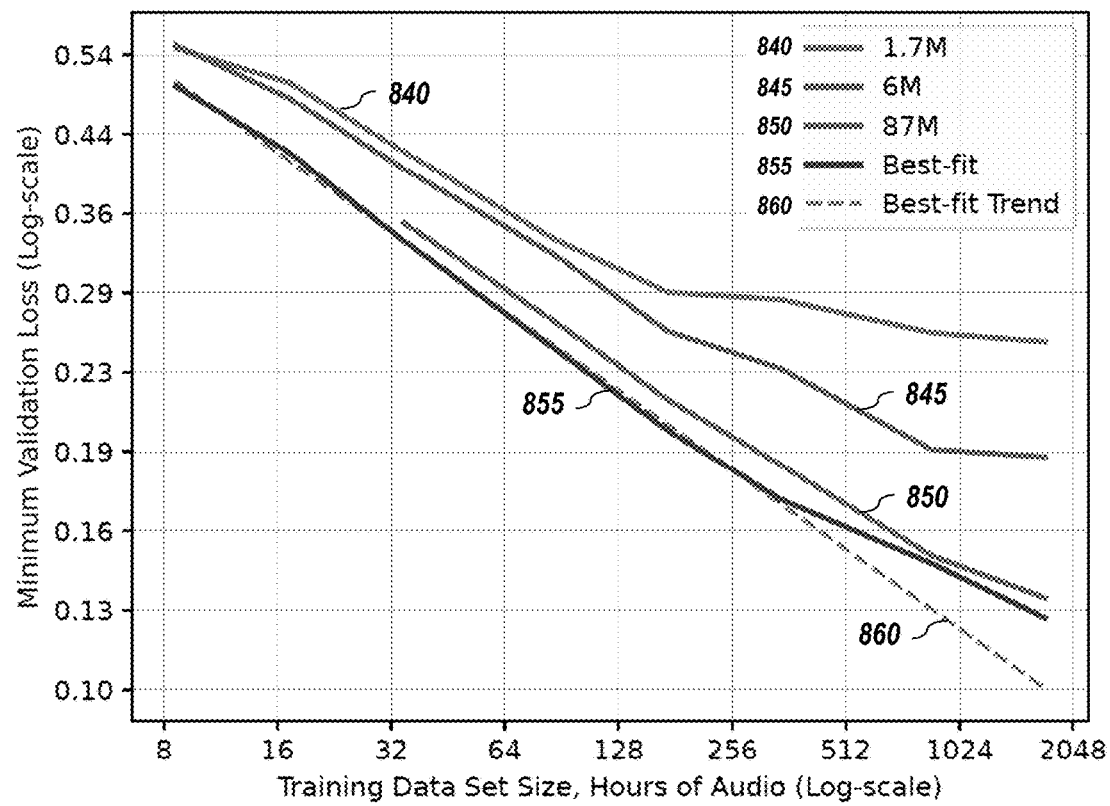
FIG. 8

*1800-T1*

Table 1. Learning Curve and Model Size Scaling Relationships for DL Domains

| Domain (model) | Current SOTA | Desired SOTA | Data Size Samples | TB | Learning Curve $\alpha$ | $\beta_g$ | Model Size $\sigma$ | $\beta_p$ | Projected Scale Data | Model |
|---|---|---|---|---|---|---|---|---|---|---|
| Word LMs (LSTM) | 3.37 nat/word | 2.48 | 768M word | 0.4 | 13.0 | −0.066 | 9.4e−4 | 0.68 | 100× | 23× |
| Character LMs (RHN) | 1.30 bit/char | 0.70 | 3.48B char | 3.7 | 9.39 | −0.092 | 1.2e−5 | 0.89 | 971× | 456× |
| NMT (enc/dec+attn) | 28% WPER | 12% | 130M WP | 1.9 | 3.06 | −0.128 | 6.4e−4 | 0.68 | 750× | 90× |
| Speech Recogn. (enc/dec+attn) | 9.5% CER | 4% | 425M char | 54 | 30.5 | −0.291 | 2.4e−3 | 0.54 | 93× | 6.6× |
| Image Classification (ResNet) | 19.4% Top-1 | 5% | 1.3M image | 12 | 15.0 | −0.309 | 2.0e−2 | 0.57 | 81× | 12× |

*1800-T2*

Table 2. Asymptotic Application-level Compute Requirements

| Domain (model) | Alg. compute (FLOPs/Param) | Alg. memory access (Bytes/Param) | Alg. operational intensity (FLOPs/Byte) | Minimal Mem. Foot. (Bytes/Param) |
|---|---|---|---|---|
| Word LMs (LSTM) | 481 $b$ | 1755 + 30784 $b/\sqrt{p}$ | $b\sqrt{p}/(3.65\sqrt{p} + 64\,b)$ | 11.94 |
| Character LMs (RHN) | 900 $b$ | 3510 + 102980 $b/\sqrt{p}$ | $b\sqrt{p}/(3.9\sqrt{p} + 114\,b)$ | 12.47 |
| NMT (enc/dec+attn) | 149 $b$ | 533 + 22653 $b/\sqrt{p}$ | $b\sqrt{p}/(3.6\sqrt{p} + 151\,b)$ | 10.32 |
| Speech Recogn. (enc/dec+attn) | 775 $b$ | 3100 + 162750 $b/\sqrt{p}$ | $b\sqrt{p}/(4.0\sqrt{p} + 210\,b)$ | 32.94 |
| Image Classification (ResNet) | 1111 $b$ | 66.7 + 268862 $b/\sqrt{p}$ | $b\sqrt{p}/(0.06\sqrt{p} + 242\,b)$ | 42.57 |

*1800-T3*

Table 3. Application-level Training Requirements Projected to Target Accuracy

| Domain (model) | Projected Data Size | Projected Model Params. | Sub-batch Size | TFLOPs/Step | Training Step Mem. Acc. TB/Step | Training Step Min Mem Foot (GB) | Accel. Time Step (secs) | Accel. Time Epoch (days) |
|---|---|---|---|---|---|---|---|---|
| Word LMs (LSTM) | 77B word | 23.8B | 128 | 1444 | 41.5 | 272 | 115 | 31K |
| Character LMs (RHN) | 3.4T char | 146B | 96 | 12618 | 488.1 | 1703 | 1007 | 3.5M |
| NMT (enc/dec+attn) | 97.4B WP | 18.9B | 96 | 499 | 18.4 | 185 | 39.8 | 16K |
| Speech Recogn. (enc/dec+attn) | 14B char. | 727M | 128 | 72 | 2.8 | 30 | 5.8 | 93 |
| Image Classification (ResNet) | 103M image | 732M | 32 | 28 | 0.4 | 34 | 2.3 | 84 |

FIG. 18

PREDICTING DEEP LEARNING SCALING

BACKGROUND

A. Technical Field

The present disclosure relates generally to systems and methods for computer learning that can provide improved computer performance, features, and uses. More particularly, the present disclosure relates to systems and methods for predicting deep learning scaling.

B. Background

Deep learning (DL) has emerged as a primary driver of recent artificial intelligence (AI) breakthroughs. As DL-enabled products grow, it becomes more important to satisfy the future hardware requirements of deep learning model training.

Deep learning researchers strive to improve accuracy. One way in which deep learning researchers seek improvement is by investigating model architecture changes to better fit data sets and improve accuracy. Model changes tend to be highly non-trivial—often requiring problem reframing—and can substantially change their computational structure. As a result, it is very difficult to predict the model structures that will be important for future deep learning applications.

Other ways besides searching for improved model architectures that the deep learning community has created impactful advances across diverse application domains is by creating large training data sets and by scaling computation. These approaches tend to help improve user experience and product adoption, which drives increased deep learning development investments in existing and emerging application domains. As data sets grow and new application domains proliferate, it would be beneficial to gain a deeper understanding of how these various factors coordinate to drive valuable product improvements.

Accordingly, what is needed are systems and methods that can better help predict one or more metrics related to deep learning scaling.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 4 depicts neural machine translation learning curves, in which the top chart (405) shows the learning curves for separate models follow $\varepsilon(m)=\alpha m^{\beta_g}+\gamma$ and the bottom chart (410) depicts a composite learning curve of best-fit model at each data set size, according to embodiments of the present disclosure.

FIG. 5 depicts learning curve and model size results and trends for word language models, according to embodiments of the present disclosure.

FIG. 6 plots the generalization and model size scaling results for character language models, according to embodiments of the present disclosure.

FIG. 7 shows learning curve and model size results and trends for ResNet image classification, according to embodiments of the present disclosure.

FIG. 8 shows learning curves (805) for a Deep Speech 2 (DS2) embodiment model and an attention speech model, and learning curves (810) for various DS2 embodiment model sizes, 1.7M to 87M parameters, according to embodiments of the present disclosure.

FIG. 18 includes TABLE 1 (Learning Curve and Model Size Scaling Relationships for DL Domains), TABLE 2 (Asymptotic Applicant-level Compute Requirements), and TABLE 3 (Application-level Training Requirements Projected to Target Accuracy), according to embodiments of the present disclosure.

DETAILED DESCRIPTION OF EMBODIMENTS

Figure 1:
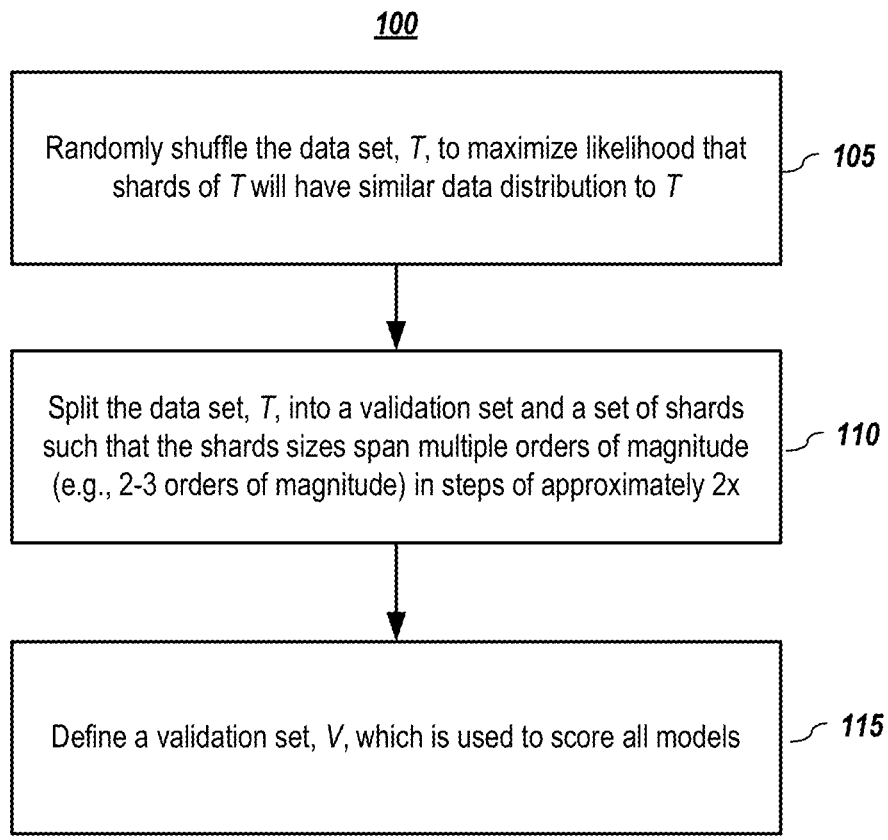
FIG. 1 depicts an example methodology for setting data sets, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. A set may comprise one or more elements.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. Introduction

The deep learning (DL) community has created impactful advances across diverse application domains by following a recipe comprising: searching for improved model architectures, creating large training data sets, and scaling computation. This recipe helps improve user experience and product adoption, which drives increased deep learning development investments in existing and emerging application domains. As noted above, it would be extremely beneficial to have a deeper understanding of how the recipe parts coordinate to drive the most valuable product improvements.

Breaking down the recipe, the challenges in the search for improved model architectures should be noted. Model search can create important new insights, which, in turn, improve products that use the novel models. However, model architecture advances often depend on unreliable epiphany; advances usually involve complex or creative reframing of the modeling problem, and research often involves large-scale hyperparameter search with some serendipity.

As a complement to model architecture search, it is important to investigate the other two recipe components—creating large training sets and scaling computation—which offer more control over progress. It is widely believed that simply using more data to train larger models should improve accuracy. However, it would be beneficial to better analyze and understand the relationships between training set scale, computational scale, and model accuracy improvements. In particular, accurately predicting generalization error scaling with training set size would provide a powerful tool for estimating the costs—in data and compute requirements—for advancing state-of-the-art (SOTA).

Although some analyzed sample complexity requirements to reach a desired generalization error, they appear insufficient to accurately predict error scaling for real applications. Generalization error "learning curves" may take a power-law form, $\varepsilon(m) \propto \alpha m^{\beta_g}$. Here, $\varepsilon$ is generalization error, m is the number of samples in the training set, $\alpha$ is a constant property of the problem, and $\beta_g = -0.5$ or $-1$ is the scaling exponent that defines the steepness of the learning curve—how quickly a model family can learn from adding more training samples. It should be noted that learning curves measure how much training data a model family requires to reach a particular accuracy; they are different from training and validation curves, which measure the number of training iterations a model needs to learn a particular data set. In real applications, it was found empirically that $\beta_g$ usually settles between $-0.07$ and $-0.35$, exponents that are unexplained by other theoretical work.

This patent document presents the largest scale empirical characterization of learning curves to date that reveals broadly that deep learning generalization error does show power-law improvement, but with exponents that may be predicted empirically. Methodologies to accurately predict generalization error and model size scaling with increased training set size are presented herein. These methodologies were used to estimate scaling relationships for six deep neural network models across four application domains: machine translation, language modeling, image classification, and speech recognition.

The results show that power-law learning curves exist across all tested domains. Although different applications yield different power-law exponents and intercepts, these learning curves exist across a broad range of models, optimizers, regularizers, and loss functions. Improved model architectures and optimizers may improve the power-law intercept, but not the exponent; models for a single domain show the same learning curve steepness. Finally, it was found that models transition from a small training set region dominated by best guessing to a region dominated by power-law scaling. With sufficiently large training sets, models will saturate in a region dominated by irreducible error (e.g., Bayes error).

Further, the significant implications of predictable accuracy and model size scaling are described herein. For deep learning practitioners and researchers, learning curves can assist model debugging and predict the accuracy targets for improved model architectures. The results herein indicate opportunities for theoretically predicting or interpreting learning curve exponents. Operationally, predictable learning curves may be used to guide decision-making about whether or how to grow data sets. Finally, learning and model size curves may be used to guide system design and expansion, and they underscore the importance of continued computational scaling.

B. Related Work

Since an objective is to accurately predict generalization error and model size scaling with increased training set size, a review of theoretical and empirical work is presented to show that they are inadequate to predict the behaviors demonstrated herein. Some investigated generalization error improvements as sample complexity increases using three approaches: theoretically bounding generalization error scaling, theoretically estimating the expected generalization error, and empirically collecting generalization error for single applications. Others also deeply analyzed the theoretical model capacity, suggesting the model size required to fit training data.

Unfortunately, although these works offer a little general guidance, they are not able to explain the empirical results presented herein. To the best of the inventors' knowledge, this patent document is the first to empirically characterize learning curve and model size scaling trends for a broad range of application domains and models.

1. Generalization Error Scaling with Data: Learning Curves

Presented below is a survey of studies that investigate learning curves. Most of these works show power-law generalization error scaling ($\varepsilon(m) \sim \alpha m^{\beta_g}$) with exponent $\beta_g = -0.5$ or $-1$.

Bounding Generalization Error: Many works provide theoretical bounds on the sample complexity to ensure particular generalization error. Early theoretical work defines a framework for bounding generalization, but makes weak assumptions that cause the predicted generalization error to be very loose. Early follow-on research tightens the bounds by relating sample complexity to generalization error through the Vapnik-Chervonenkis (VC) dimension of the target concept class. All of these bounds show power-law relationships under certain assumptions, such as the hypothesis space must contain at least one model that can correctly fit the data or the training data size must be much larger than the capacity of the models. These assumptions are often too strict for real applications, so the bounds are usually loose or even vacuous. Others tighten bounds for the common real application setting that model size is larger than the number of samples in the data set. However, despite the breadth of sample complexity bounds investigations, straightforward bounds that explain the empirical results herein did not exist.

Estimating Expected Generalization Error: Some work also evaluated the expected generalization error in certain contexts. Using statistical mechanics approaches, some showed that as sample complexity grows, generalization error should decline as a power-law $\varepsilon(m) \sim \alpha m^{\beta_g}$ with $\beta_g = 0.5$, 1, or 2. These trends depended on assumptions about the problem and gave the expectation across all possible data distributions. Others showed that similar expectations hold for certain models, such as single- and multi-layer perceptrons, and committees of networks. Appendix B (see Section I, below) adds to this corpus, showing that a counting model used to predict the probability of a weighted coin-flip converges with the power-law exponent of $\beta_g = -0.5$.

Despite the breadth of others' work estimating the expected generalization error in various contexts, the empirical results in this patent document show yet unexplained power-law exponents between $\beta_g = 0.07$ and $0.35$ on various real-world problems.

Empirical Generalization Error Scaling: A few studies empirically investigated the way generalization error scales with training data size. Some tested a language modeling problem (confusion set disambiguation) trained using subsets of a billion-word corpus of text. Their results appeared to show power-law scaling of the average disambiguation validation error. In speech recognition, Amodei et al. (full citation is provided in Section J, below) (also in commonly-assigned: U.S. Prov. Pat. App. Ser. No. 62/260,206, filed on 25 Nov. 2015, entitled "DEEP SPEECH 2: END-TO-END SPEECH RECOGNITION IN ENGLISH AND MANDARIN"; U.S. patent application Ser. No. 15/358,120, filed on 21 Nov. 2016, entitled "END-TO-END SPEECH RECOGNITION"; and U.S. patent application Ser. No. 15/358,083, filed on 21 Nov. 2016, entitled "DEPLOYED END-TO-END SPEECH RECOGNITION", each of the aforementioned patent documents is incorporated by reference herein in its entirety and for all purposes) showed word error rate improvement for a Deep Speech 2 model embodiment on varying sizes of training data. They used, in an embodiment, a fixed model size of 68M parameters and showed power-law word error rate (WER) gains from increased data. Others showed image classification accuracy improved with training data size, but curiously, they concluded that accuracy increased logarithmically based on volume of training data size.

Although some works studied generalization error scaling trends empirically, the community has yet to definitively conclude that power-law error scaling should exist across most deep learning domains.

2. Model Capacity Required to Fit Data

Some studies proposed various measures of model capacity based on a model's organization and parameterization, and these measures hinted at the model size required to fit a training set. It is expected that number of model parameters to fit a data set should follow $s(m) \propto \alpha m^{\beta_g}$, where $s(m)$ is the required model size to fit a training set of size m, and $\beta_g \in [0.5, 1]$.

Vapnik and Chervonenkis defined the VC dimension of a model as the cardinality of the largest set of data points that a model can shatter. Follow-on work used data complexity measures to estimate the structure of model families that might fit the data. Recent work also defined bounds on the VC dimension of particular deep neural network models, including showing that recurrent neural network models have the same effective capacity if the optimization scheme is well-tuned and training runs long enough.

Work to empirically estimate model scaling with training set size is very sparse. The Banko and Brill (2001) confusion set disambiguation work claims that the model size required to fit the data grows log-linearly. Their Winnow and memory-based models were estimated to grow with the same power-law exponent to larger data sets, $\beta p \approx 0.72$.

While these theoretical and empirical results offer insight about required model sizing, recent work has noted the need for more practical guidance. These studies show that while model capacity might explain a model's ability to memorize training examples, capacity may not adequately explain the model's ability to generalize to new examples. Rather than reason through these complexities, it is currently easier for researchers and practitioners to over-parameterize models to fit training data.

C. Measuring Model Accuracy and Size Scaling with Training Data Size

With the general guidance in mind, one focus of attention herein was on accurately estimating learning curves and model size scaling trends. In one or more embodiments, the effects of scaling data size were measured on generalization error and model size using the following methodology. In one or more embodiments, the general process is to select state-of-the-art (SOTA) models and to train "hyperparameter-reduced" versions of these models on successively larger subsets (referred to herein as "shards") of a training set to see how the accuracy of the model grows with training set size.

First, for each of the machine learning domains, a survey of recent work was performed to find the model architectures that show SOTA generalization error on a large data set. Here, a "large data set" is a training set that could be reduced in size by 2-3 orders of magnitude and still be significant enough to perform valuable model architecture studies. More than one model architecture was selected for some machine learning domains to compare their scaling behaviors.

Data sets: FIG. 1 depicts an example methodology for setting training data sets, according to embodiments of the present disclosure. Given a SOTA model architecture, M, and a training set, T, an experimental infrastructure may be set up as follows. First, the training data set, T, is randomly shuffled (105) to maximize the likelihood that shards of T will have similar data distribution to T. In one or more embodiments, the training data set, T, is subdivided (110) into shard sizes that span 2-3 orders of magnitude in steps of roughly 2 (e.g., $T_0$ is 0.1% of T, $T_1$ is 0.2%, $T_2$ is 0.4%, etc.). In one or more embodiments, a single validation set, V, which is used to score all models (even trained on different shard sizes of T), is defined (115). In one or more embodiments, the validation set may be defined such that none of the data in the valuation set has overlap with the training data set, that is, $\forall i$, $V \cap T = \emptyset$. In one or more embodiments, V is sufficiently large to approximate true generalization error with low variance. In one or more embodiments, the validation set available with training data may be used, or if such a validation set is not available, a hold-out subset of T that does not overlap with any of the T shards may be used.

In one or more embodiments, the metric used to measure the size of the data set should accurately represents the observable size of the training set. For example, character language models truncate time-series input sequences at a maximum length and discard the rest of the sequence from the training set. In such situations, the data set size should only count the portion of the input sequences observed by the model during a full training run.

Figure 2:
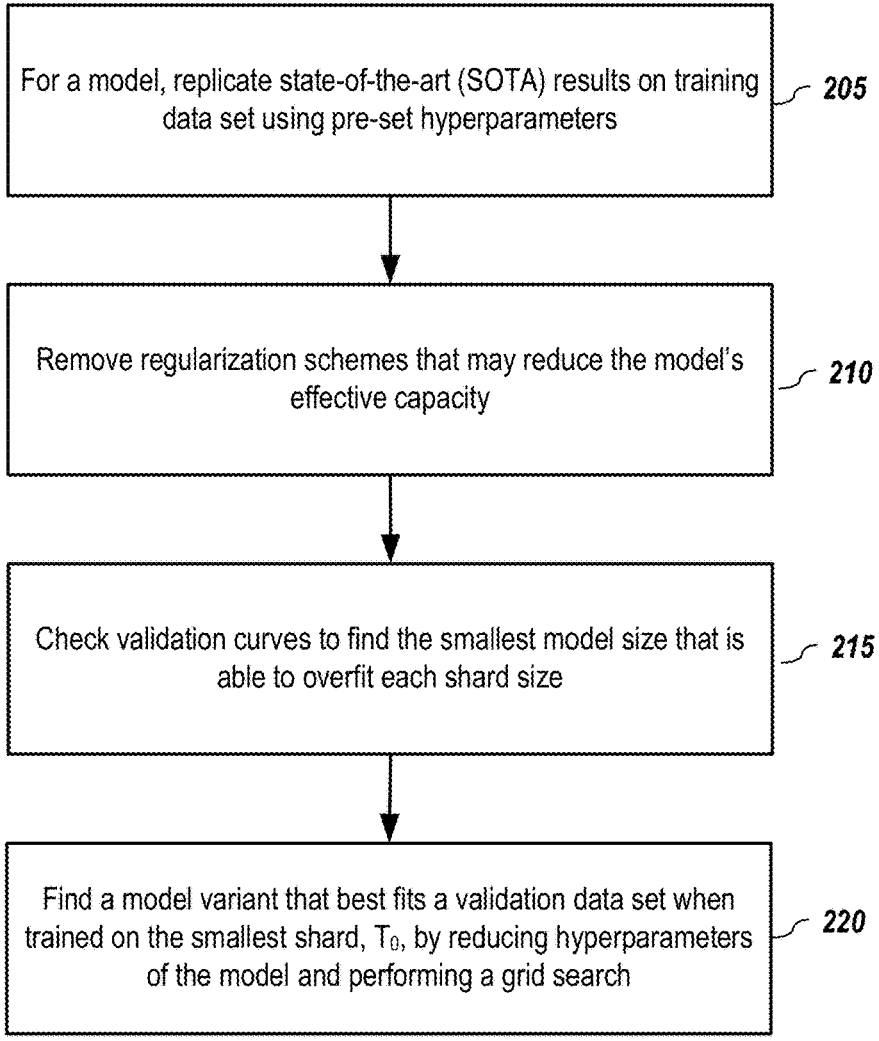
FIG. 2 depicts an example methodology for model setup, according to embodiments of the present disclosure.

Model setup: FIG. 2 depicts an example methodology for model setup, according to embodiments of the present disclosure. In one or more embodiments, the SOTA results are replicated (205) on T, setting hyperparameters of M as described in the corresponding works. Next, to understand the importance of model capacity to fit a training set, the experiments are controlled by removing (210) regularization schemes that might reduce the model's effective capacity (e.g., weight decay). With this simplification, validation curves may be inspected to find the smallest model size that is able to overfit each shard size of T. For models that achieve SOTA results while underfitting on their training set, the training set size is reduced (215) to a scale that the model can overfit.

In one or more embodiments, a goal is to find a model variant of M that best fits V when trained on the smallest shard, $T_0$, and to find this variant, hyperparameters of M are reduced (220) and a grid search is performed. Similarly, in one or more embodiments, a model variant of M that best fits the largest shard or the full data set may also be found and used. A set of model candidates $\mathcal{M}_0 = \{M_{0;0}, M_{0;1}, M_{0;2}, \ldots\}$, by constraining M's model capacity, changing hyperparameters such as layer count, hidden node count, etc., are generated. From this search, a model is found, $\widehat{M_0} = \arg\min_{M_{0;j} \in \mathcal{M}_0} (\mathcal{L}(M_{0;j}, V))$, which gives the best validation loss, $\mathcal{L}$, on V when trained on $T_0$.

Figure 3:
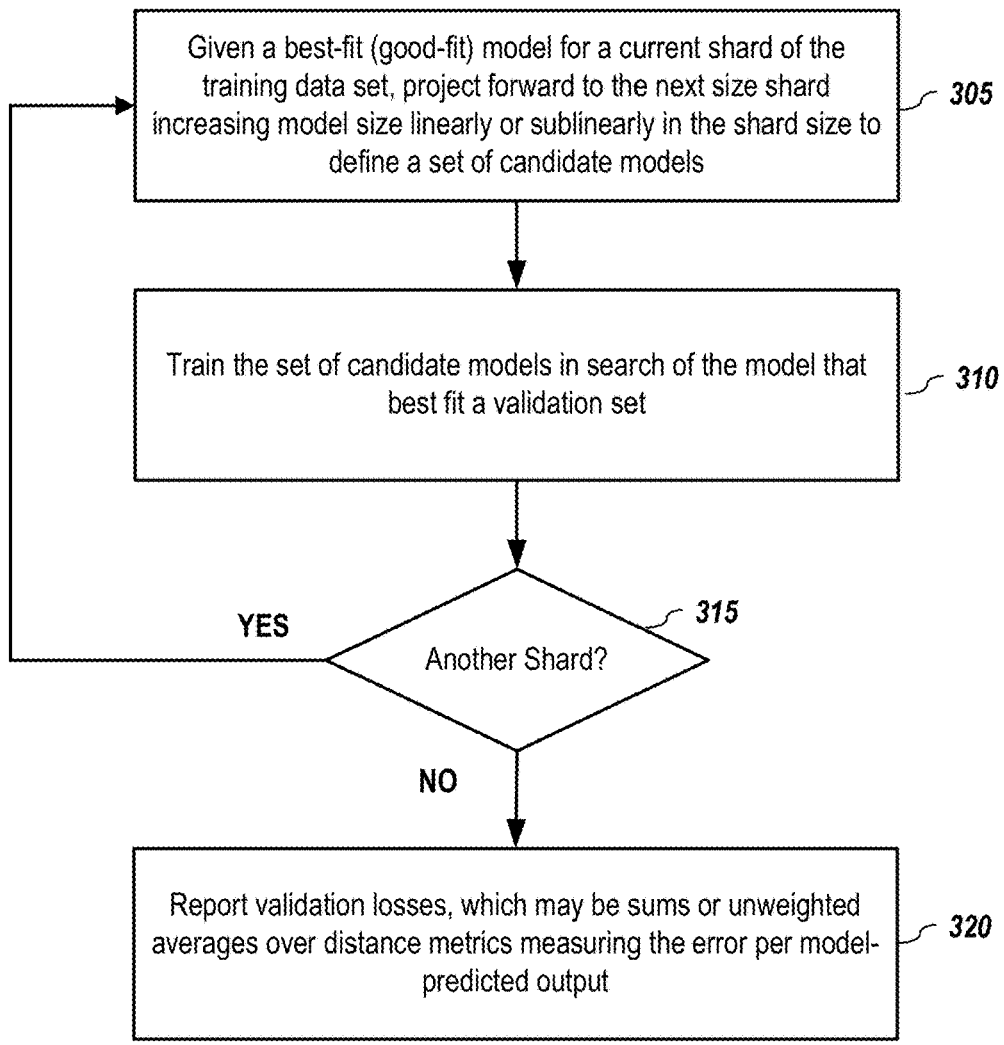
FIG. 3 depicts an example training methodology, according to embodiments of the present disclosure.

Training procedure: FIG. 3 depicts an example training methodology, according to embodiments of the present disclosure. Finally, with best-fit models defined for the smallest and largest shards of T, in one or more embodiments, a stochastic Monte Carlo grid search is performed to find the best-fit hyperparameter-reduced models as one steps through successively larger shards of T.

Specifically, given a best-fit model size for shard $T_i$, it is projected (305) forward to the next shard size (i.e., $T_{i+1}$). In one or more embodiments, the projection may include increasing model sizes linearly or sublinearly in the shard size—to define a set of candidate models (or a family of models) $\{M_{i+1;0}, M_{i+1;1}, M_{i+1;2}, \ldots\}$. In one or more embodiments, these models are trained (310) in search of the model that best fit the validation set. In one or more embodiments, a search over optimization parameters (such as batch sizes and learning rates) is performed; and in one or more embodiments, training with different random seeds may be re-run to aid the search. In embodiments, this process is repeated (315) until training on each shard has been performed and a best-fit model for each shard has been identified.

In one or more embodiments, the validation losses of the best-fit models are reported (320), which may be reported as sums or unweighted averages over distance metrics measuring the error per model-predicted output. In one or more embodiments, this loss structure is important to the predictivity of the resulting learning curves. Depending on problem domain, error metrics include, but are not limited to, cross-entropy, $L^p$ norms, and classification error. In some cases, training may optimize a different loss function than what was report as the validation loss (see Appendix A in Section H, below, for more details).

D. Data Set and Model Size Scaling Relationships

In this section, empirical results are presented showing how increasing training data size results in power-law scaling of generalization error and required model size to fit the training set for four domains: machine translation, language modeling, image classification, and speech recognition. These power-law relationships hold for each machine learning domain and across various model architectures, optimizers, and loss metrics. In many cases, it was also found that model size growth with data set size grows sublinearly. Throughout this section, there is specific reference to power-law exponents for generalization error ($-0.5 \leq \beta_g < 0$ in $\varepsilon(T_i) = \alpha |T_i|^{\beta_g}$) and number of model parameters ($0.5 \leq \beta_p < 1.0$ in model size $= \alpha |T_i|^{\beta_p}$).

1. Neural Machine Translation

In one or more embodiments, the learning curve investigation commenced with a case study in neural machine translation (NMT). Translation converts text input in one natural language to output text in another language. Relative to other deep learning domains, NMT has low-dimensional input and output spaces, and can be trained with large labeled data sets. The results herein show learning curve character similar to theoretical predictions, though the power-law exponents are smaller (i.e., $\beta_g \approx -0.128$ rather than $-0.5$).

To test NMT, a SOTA sequence-to-sequence model with global attention was trained on the 2016 Conference on Machine Translation (WMT' 16) German-to-English data set. A publicly available implementation of this architecture in OpenNMT was used. The encoder contained two layers of bidirectional long short-term memory units (LSTMs), and the decoder contained the attention layer and stack of LSTM layers. To simplify training this SOTA model, ensembling and data augmentation techniques were removed.

To scale model sizes, LSTM input and hidden state sizes were tied together, and there were changed so that the total parameter count decreased roughly linearly with data set size. Adam was used to optimize per-sequence cross-entropy loss and report the per-token classification error. Models were selected using the newstest2015 validation set, and the other newstest development sets from 2009 to 2013 were used for evaluation. Results presented here are with dropout rate of 0.2, although similar learning curve exponents were found in testing without dropout.

The data set was cleaned and tokenized using Moses as described by Luong et al. (2017). The byte-pair encoding (BPE) method described by Sennrich et al. (2016) was used to build a shared word-piece vocabulary between English and German. After preprocessing, the training set included 4.5 million training sequences with roughly 130 million tokens in each language. The training data and sample training shards were uniformly randomly shuffled as described in Section C.

In initial tests, an aim was to replicate theoretical results as closely as possible. Theoretical work indicated that the expected classification error learning curve for a single model family (i.e., of fixed capacity) is a power-law with exponent $\beta_g = -0.5$. Further, some predicted that as a model runs out of capacity on larger data sets, the error should plateau, resulting in a power-law+constant, $\varepsilon(m) \sim \alpha m^{\beta_g} + \gamma$, where $\gamma$ is the error when the model family has exhausted its capacity.

Indeed, it was found that learning curves for a single model family can be closely represented by a power-law+ constant. However, it was found that $\beta_g$ is smaller in magnitude than $-0.5$. Fixed size models were trained on each of the training shards. The top plot 405 in FIG. 4 shows the learning curves for two different model sizes with 208 or 512 hidden nodes per LSTM layer (17M and 48M parameters, respectively). Learning curves with $\beta_g = -0.360$ and $-0.300$, respectively, fit the empirical results with less than 0.6% relative root mean square error.

For these experiments, controls as close to theoretical assumptions as possible were used. The same loss function and classification error were used. To approximate the generalization error expectation calculations without an excessive number of training runs, models were selected using the median minimum validation error across multiple training runs with separate random seeds. Factors such as the assumed data distribution were not control nor could it be ensured that the model family contained a model that could correctly represent the data generating function. These factors might account for a portion of the gap from theoretical to empirical $\beta_g$.

Unlike these initial tests, deep learning practitioners and researchers often grow model sizes as training data grows to ensure sufficient capacity. They would rather see a composite learning curve representing the best-fit model at each training set size. The bottom plot 410 in FIG. 4 shows the composite learning curve for NMT. The best-fit results form a longer power-law region. It was found that $\beta_g$ was even smaller than the single-model learning curves; if projecting forward, $\beta_g$ would be approximately $-0.128$. The rest of the results aim to characterize the steepness of these composite best-fit learning curves.

It should be noted that as training set sizes grow, optimization becomes more difficult and models run out of capacity, so the empirical error tends away from the power-law trend. This divergence is common across domains, as shown below, and a more exhaustive hyperparameter search would be required to find results closer to the existing power-law.

2. Language Modeling

Language models (LMs) aim to predict probability distributions for the next character, word, or other textual grams conditioned on a previous sequence of input text. LMs are very important model features for domains such as speech recognition and machine translation, helping to identify most probable sequences of grams. Similar to NMT, LMs have low-dimensional input and output spaces, and can be trained with very large labeled sets.

LM learning curves and model size scaling relationships are the most robust; word and character language models show clear and predictable power-law learning curves, and the power-law exponents tend to be small ($\beta_g \in [-0.09, -0.06]$). These small exponents indicate that current language models will require significantly more data to significantly improve accuracy. The word and character models that give the best generalization error grow sublinearly in the training set size ($\beta_p \approx 0.7$).

a) Word Language Models

LSTM-based word language models (LMs) were trained that were early SOTA models as described in Jozefowicz et al. (2016) with some small changes. To reduce the computational requirements of the models, the vocabulary was restricted to the top 10,000 most frequent words in the Billion Word Data set (Chelba et al. (2013)). The networks were 2- or 4-layer LSTMs with the same number of hidden weights in each layer, and the number of layer weights were scaled to modulate the model size and the best fit model was found for each training shard size. The LSTMs were compared against Recurrent Highway Networks (RHNs) described in Zilly et al. (2017). Specifically, a single-layer, depth 5 RHNs was trained to see if the different network organizations showed different generalization trends. A stochastic gradient descent optimizer (SGD) with per-sequence cross-entropy loss was used, and per-predicted-word average cross-entropy loss was reported. Dropout was not used. The models were trained on shards ranging from 0.1% up to 40% of the Billion Word Data set.

FIG. 5 shows the learning curve and model size results for LSTM and RHN word language models, according to embodiments of the present disclosure. First, the loss scaling relationships are smooth power-law functions of the data set size with almost exactly the same exponents: $\beta_g=-0.0656\pm1\%$. Again, larger models have more difficulty optimizing to fit the larger training sets. For word LMs, more was invested in batch size and learning rate tuning to find the best model on these larger training shards. The tuned models settled at or just above the power-law trend, suggesting that further hyperparameter search is likely to yield a model on the trend.

Strikingly, although these model architectures differ appreciably, they all show the same learning curve profile characterized by the power-law exponent. Increasing the LSTMs depth from 2 to 4 layers decreases the networks' accuracy by about 1.5%, but both model architectures see the same relative loss improvement as training set size was increased. RHNs have significantly different recurrence structure than LSTMs but show nearly identical learning curves.

Model size results show that best-fit models grew sublinearly in the training shard size. Specifically, the best-fit 2-layer LSTM and depth-5 RHNs model sizes grew roughly with $\beta_p=0.69\pm5\%$. The 4-layer LSTMs show slightly worse scaling with $\beta_p=0.78$, suggesting they make less effective use of extra parameters on larger data sets. Despite the model size scaling differences, for a given model architecture, the model size that will best fit increasingly larger data sets can be predicted accurately.

b) Character Language Models

To test character-level language modeling, RHNs of depth 10 were trained, which were found to achieve SOTA accuracy on the Billion Word data set. The number of layer weights were scaled to modulate the model size and the best fit model for each training shard size was found. SGD was used, optimizing for per-predicted-character cross-entropy loss, which is reported on the validation set. The SGD was also compared against the Adam optimizer to test their effects. The input and output vocabulary includes all alphanumeric characters and common symbols for total size 98. The models were trained on shards of 0.01% up to 4% of the Billion Word data set.

Results for character LMs appear substantially similar to word LMs. FIG. 6 plots the generalization and model size scaling results for character LMs, according to embodiments of the present disclosure. As with word LMs, generalization improved on a power-law as training data size increased, though the exponent is $\beta_g=-0.0936$ for the SGD optimizer and $\beta_g=-0.0954$ for the Adam optimizer. These power-law exponents are very similar despite the significant optimizer differences—Adam appears to just shift the learning curve down by ~5% relative.

Like word LMs, character LMs also learn significantly more slowly than predicted by theoretical results. Though word and character LMs have some major differences, their learning curve exponent differences indicate that character LMs are able to learn relationships between characters with successively fewer samples than word LMs are able to learn relationships between words.

Character LMs also show sublinear model size growth as data set size increases. Specifically, $\beta_p=0.78$ for SGD optimized models and $\beta_p=0.92$ for Adam optimized. Character LMs with the SGD optimizer see similar improvements from increased model size as word LMs, while the Adam optimized models see poorer scaling and require significantly more parameters (~8-11×). Still, their learning and model size curves appear predictable.

3. Image Classification

As a comparison to the machine translation and language modeling results—where inputs and outputs are low-dimensional time-series data—image classification, a machine learning domain that aims to identify objects in high-dimensional image data, was also tested. Image classification is used in applications such as object recognition, image captioning, and tagging video content. Image classification also shows power-law learning curves and model size scaling relationships. It is also shown that accuracy plateaus near random guessing on very small training sets.

ResNets (He et al. (2016)), which were recently the SOTA architectures for ImageNet classification (Russakovsky et al. (2015)), were also tested. ResNets are deep networks built from blocks containing convolutions, nonlinearities, and pooling layers. They have residual connections from the inputs to outputs of most blocks that permit the network to bypass layers. ResNets was trained and validated on various shard sizes of ImageNet, ranging from 1 image per class (0.08% of images) up to 800 images per class (62%). ImageNet has 1,000 different object classes as outputs.

Starting with 5 known variants of ResNets with depths 18, 34, 50, 101, and 152 layers, the model sizes were scaled by changing the number of layers ranging from 10 to 200. To provide even finer-grained model size control, the number of convolution filters were changed using a scaling factor. Filter counts were scaled proportionally across all convolution blocks with scaling factors 0.0625 to 1.5. Models with parameter counts ranging from 89K to 121M were tested. A Nesterov Momentum optimizer targeting classification cross-entropy loss was used. Weight regularization was removed.

FIG. 7 shows that various loss calculations follow the power-law learning curves, according to embodiments of the present disclosure. Average validation cross-entropy, top-1, and top-5 classification errors are reported. For small training sets—less than roughly 25 images per class—these error metrics are roughly equal to the model random guessing (i.e., greater than $-\log(1/1,000)\approx6.9$ for cross-entropy, and near $1-(1/1,000)=99.9\%$ classification error for top-1 and top-5). Models were unable to extract enough information from these small training sets to make many accurate classifications on the validation set. This is later described as the "small data region."

As long as the training set is large enough, it was observed that generalization improves on a power-law, but the power-law exponent was different for each of the reported metrics. The top-1 classification error exponent is $\beta_g=-0.309$. On the other hand, the exponent for top-5 classification error is $\beta_g=-0.488$. Since top-5 classification is a superset of top-1 classification, the top-5 error should improve at least as quickly as top-1, but in fact, the top-5 error improves significantly more quickly as training data size increases. The validation cross-entropy exponent is $\beta_g=-0.35$, but the metric has different range than classification error, so their exponents may not be directly compared.

Finally, FIG. 7 also shows that model size growth is again predictable. The best-fit ResNet models grew following a sublinear curve with exponent $\beta_p=0.573$. This exponent indicates that they grew more slowly than models in other tested domains. However, even on the smallest data sets, ResNets required fairly large models to fit data well, at least 3.4M parameters.

4. Speech Recognition

Speech recognition techniques convert acoustic speech signals into text or commands. Speech recognition is used in diverse applications such as voice-powered machine controls and conversational user interfaces. Recent research has shifted from hand-engineered speech recognition pipelines over to end-to-end deep-learning-based methods that show promising results. Speech recognition provides an interesting contrast to prior domains; speech input data is medium-dimensionality time-series data.

To test trends in speech recognition, two recent SOTA models were tested: Deep Speech 2 (DS2) (referenced above) embodiments and an attention-based model. The DS2 model embodiment comprised two 2D convolution layers followed by four bidirectional LSTM recurrent layers. Adam was used to optimize connectionist temporal classification loss. The DS2 embodiment was compared against a hybrid attention model similar to those described by Battenberg et al. (2017). The model has an encoder comprised of three bidirectional LSTM layers with two intermediate max-pooling layers, and a hybrid attention decoder. Adam was used to optimize output sequence average cross-entropy loss. For both models, regularization (weight decay and noise) was removed to observe underfitting or overfitting models.

The inputs to these models were a sequence of log-spectrograms of power normalized audio clips, calculated on 20 millisecond (ms) windows. Outputs were the English alphabet along with the blank symbol. Language models was not included for output sequence beam search, and per-predicted-output character error rate on the validation set were reported. Training was done on shards of labeled data set comprising 11,940 hours of speech containing 8 million utterances.

To vary the number of parameters in both the DS2 model embodiment and the attention model, the number of weights in all LSTM layers were varied, so that separate layers had the same number of weights. In the attention model, the number of weights in the attention LSTM and decoder cells were also proportionally scaled. For the DS2 model embodiment, model sizes ranged between 300K to 193M parameters, and for the attention-based models, sizes ranged from 95K to 156M parameters.

Chart 805 in FIG. 8 shows that both DS2 model embodiments and attention-based speech model experience the same power-law learning curve improvements, according to embodiments of the present disclosure. Although these models have significantly different encoders and decoders, they see the same relative improvements in character error rate as training set size increases with $\beta_g = -0.299 \pm 0.7\%$. Consistent with other work, larger attention models trained on larger data sets tend to be easier to optimize than DS2 embodiment models, whose generalization error tends away from the power-law trend on larger data sets.

For speech recognition, a coarser spectra of model sizes were trained, so model size scaling results for each training data size were not as meaningful as with LMs or image classification. Instead, the learning curves is broken down a bit by showing the curves for three different DS2 model embodiment sizes, 1.7M to 87M parameters (chart 810 in FIG. 8). These curves show similar trends to those in other domains: As data size increases, most models experience power-law generalization improvements until the data size approaches their effective capacity. In this case, the 1.7M parameter model's accuracy plateaus starting at around 170 hours of audio, and the 6M parameter model plateaus around 860 hours of audio (i.e., roughly 5× more, which is similar to the difference in model size). Larger models (e.g., 87M parameters) show generalization error close to the best-fit trend up to larger data set sizes.

E. Implications of Generalization Error and Model Size Scaling

Predictable learning curves and model size scaling indicate some significant implications on how deep learning could proceed. For machine learning practitioners and researchers, predictable scaling can aid model and optimization debugging and iteration time, and offer a way to estimate the most impactful next steps to improve model accuracy. Operationally, predictable curves may guide decision-making about whether or how to grow data sets and/or computation. Finally, these curves may be used to estimate compute requirements and guide system design and expansion. They underscore the importance of continued computational scaling.

1. The Learning Curves of Real Applications

Figure 9:
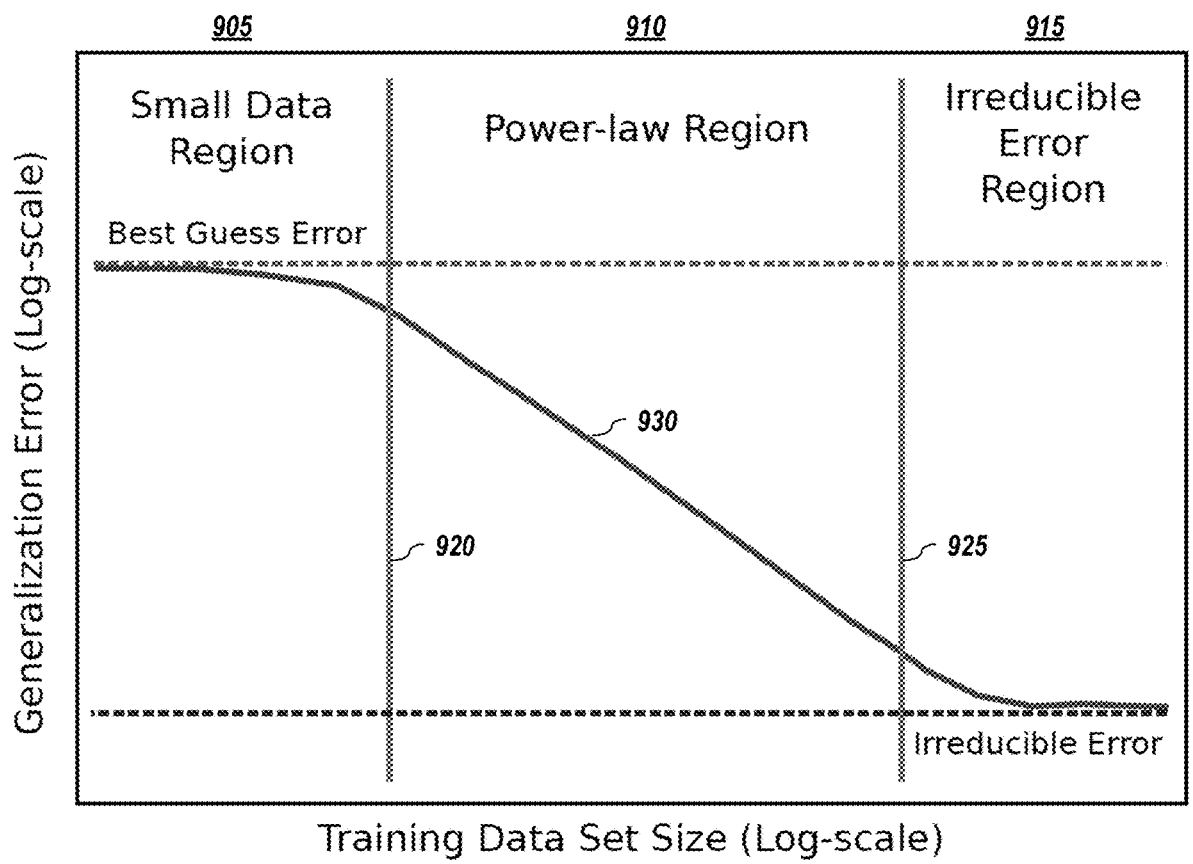
FIG. 9 shows a power-law graph that breaks down learning curve phases for real applications, according to embodiment of the present disclosure.

A summary of the character of real application learning curves is first presented. FIG. 9 shows a sketch power-law plot that breaks down learning curve phases for real applications, according to embodiment of the present disclosure. The curve begins in the small data region 905, where models will struggle to learn from a small number of training samples. Here, models perform as well as "best" or "random" guessing.

The middle portion 910 of learning curves is the power-law region, where each new training sample provides information that helps models improve predictions on previously unseen samples. The power-law exponent defines the steepness of this curve, or the slope 930 when viewed on a log-log scale. It is an indicator of the difficulty for models to represent the data generating function. Results in this patent document indicate that the power-law exponent is unlikely to be easily predicted with prior theory and probably dependent on aspects of the problem domain or data distribution.

Finally, for most real-world applications, there is likely to be a non-zero lower-bound error past which models will be unable to improve. This lower bound 915 includes Bayes error—the information theoretic lower bound based on the data generating function—and a combination of other factors that cause imperfect generalization. For instance, mislabeled samples in the training or validation data sets are likely to cause irreducible error. This region is referred to herein as the irreducible error region 915. Although the irreducible error region has yet to be reached for real applications in this study, this lower bound was tested and existed for toy problems.

Figure 10:
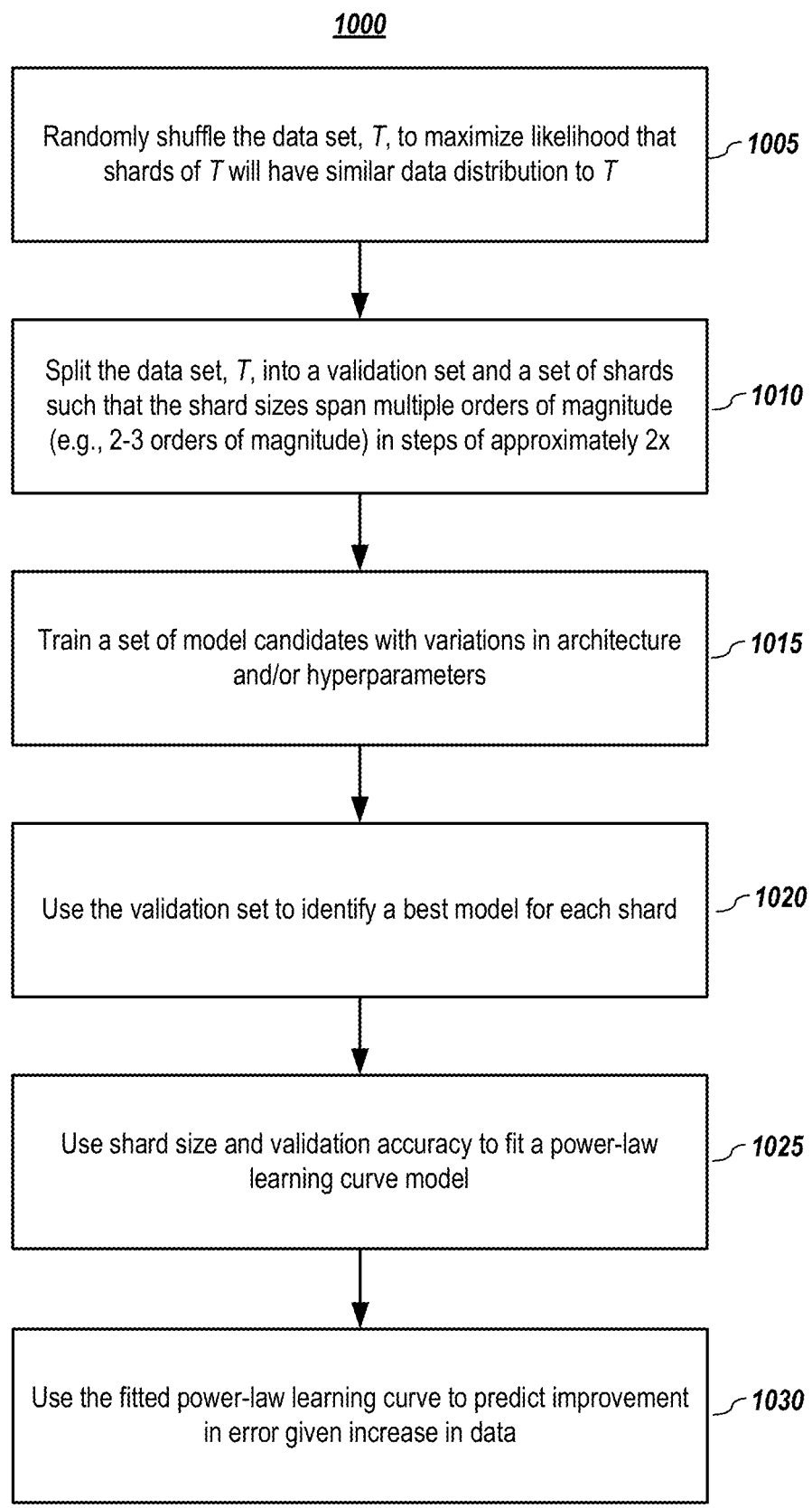
FIG. 10 presents a general methodology for using the power-law relationship to aid in targeting accuracy, according embodiments of the present invention.

FIG. 10 presents a general methodology for using the power-law relationship to aid in targeting an accuracy, according embodiments of the present invention. In one or more embodiments, a data set, T, is randomly shuffled (1005) to maximize likelihood that shards of T will have similar data distribution to T. In one or more embodiments, the data set, T, is then split (1010) into a validation set, V, and a set of shards such that the shards sizes span multiple orders of magnitude (e.g., 2-3 orders of magnitude) in steps of approximately 2× (e.g., $T_0$ is 0.1% of T, $T_1$ is 0.2%, $T_2$ is 0.4%, etc.). In one or more embodiments, the validation set may be defined such that none of the data in the valuation set has overlap with the training data set, that is, $\forall i, V \cap T = \emptyset$. In one or more embodiments, V is sufficiently large to approximate true generalization error with low variance. In one or more embodiments, the validation set available with training data may be used, if available, instead of using a hold-out subset of T.

In one or more embodiments, a set of models (or a family of models with variations in architecture and/or hyperparameters) are trained (1015) using the set of shards. Having trained the models, the validation set may then be used (1020) to identify a best model for each shard. In one or more embodiments, a metric used to measure the size of the data set should accurately represents the observable size of the training set. For example, character language models truncate time-series input sequences at a maximum length and discard the rest of the sequence from the training set. In such situations, the data set size should just count the portion of the input sequences observed by the model during a full training run.

For each best model, the validation losses, which may be sums or unweighted averages over distance metrics measuring the error per model-predicted output, is used to help fit a power-law curve. For example, in one or more embodiments, the shard size and validation accuracy of the best fit models may be used (1025) to fit a power-law learning curve model, similar to that in FIG. 9.

Figure 11:
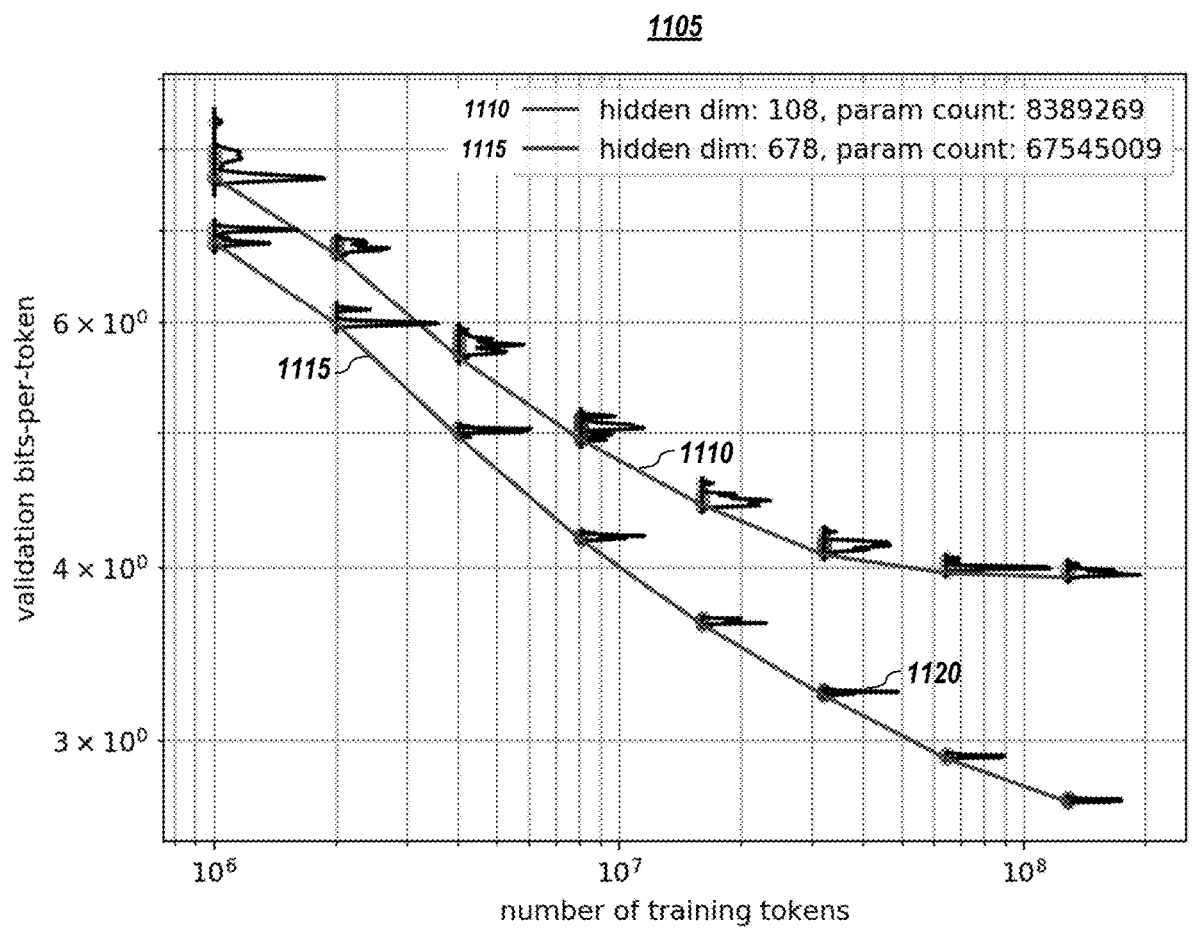
FIG. 11 depicts violin plots of learning curves for neural machine translation and that shows that overall the variance is small relative to the reduction in validation error, and that the variance is reduced with more training data and also with larger models, according to embodiments of the present disclosure.

FIG. 11 uses a violin plot to show the distribution of validation errors across 30 repetitions of the machine translation experiment with 8M and 67M parameters with different seeds for weight initialization and shard creation, for each training data shard size, according to embodiments of the present invention. It was found that overall the variance is small (e.g., variance 1120) relative to the reduction in validation error for each shard, and that the variance is reduced with more training data and also with larger models (e.g., model for 1110 relative to model for 1115, which is larger). This indicates that results herein are repeatable and become even more stable for larger data sets.

The results herein indicate that deep learning model development can benefit from predicting accuracy, data size, and/or model size. One skilled in the art shall recognize that given a power-law curve, various measures may be predicted. For example, an increase in accuracy may be predicted versus an increase in data set size; therefore, if a certain error/accuracy is wanted, the corresponding data set size can be predicted that is required to achieve such an accuracy level. One skilled in the art shall recognize that other metrics or measures may be predicted using methods of the current disclosure. For example, the computational requirements may be determined given predicted data set size and model parameter size; additional information regarding projecting the growth in computational requirements to train target applications is provided in Section F, below. Additionally, for example, empirically estimating model scaling with training set size may be performed, as tests herein find good power-laws fits for model size, i.e. $s(m) \sim \alpha_p m^{\beta_p}$, where $s(m)$ is the required model size to fit a training set of size m. That is, given that empirical measurements of scaling have been presented, it would be valuable to estimate the basic statistics of the scaling model parameters ($\alpha$, $\beta_g$, $\gamma$, $\alpha_p$, $\beta_p$).

2. Additional Implications for Deep Learning Practitioners and Researchers

The results herein indicate that in many real-world contexts, simply scaling training data set and models is likely to predictably improve the model's accuracy. This predictable behavior may be used to help practitioners and researchers approach debugging and target better accuracy scaling.

Debugging Deep Learning Training: The empirical learning curves collected herein show robust power-law regions. Surprisingly, a power-law region is seen across all the tests, which cover different problem domains, model architecture features, optimizers, and optimization functions. TABLE 5 in Appendix A (Section H, below) shows the breadth of architectural and optimization features in the tests herein.

Given the robustness of the power-law learning curve character, deep learning practitioners and researchers should consider this methodology for debugging data, model architecture, or optimization issues. Divergence from power-law-like improvements is likely to indicate deeper challenges with improving accuracy. For instance, when word and character language models began to diverge from power-law scaling for the 10% and 2% of the Billion Word benchmark, respectively, this divergence was seen as a cue to more exhaustively test hyperparameters. It was found that larger training sets and larger models become harder to optimize. For large models with fixed hyperparameters, increasing the batch sizes and learning rates usually closed a significant portion of the gap to the power-law trend. Analogously, smaller training sets often require smaller batch sizes to ensure models behave well while fitting. Other model debugging, such as finding good model priors or initialization, may also benefit from this methodology.

Beating the Power-law: Machine learning researchers often try to improve model accuracy by changing model architectures trained on a given data set. Their efforts can involve complex trial-and-error and rely on creativity or epiphany to improve results. The tests herein indicate that model architecture improvements, such as model depth, only shift learning curves down but might not improve the power-law exponent.

A broader question is whether machine learning techniques could improve the power-law learning curve exponent, or in other words, to improve generalization more quickly as training data grows. Theory suggests that best case accuracy scaling is with $\beta_p = 0.5$ or 1. Thus, for some problem domains—especially language modeling—the potential accuracy improvements are immense given ways to improve the power-law exponent.

To beat the power-law as data set size increases, models would need to learn more concepts with successively less data. In other words, models must successively extract more marginal information from each additional training sample. This might be difficult without adjustments to the data set. Analysis of learning curves when using data handling techniques, such as data filtering/augmentation, few-shot learning, experience replay, and generative adversarial networks, would be beneficial.

3. Operational Implications

Learning and model size curves can also guide decisions about data collection and scaling computation. When projecting forward on learning curves, three types of scaling limits may be encountered: training data is too small, computation is too slow, or irreducible error.

Model Exploration using Small Data: It may seem counterintuitive, but an implication of predictable scaling is that model architecture exploration should be feasible with small training data sets. Consider starting with a training set that is known to be large enough that current models show accuracy in the power-law region of the learning curve.

Since model accuracy is expected to improve proportionally for different models, growing the training set and models should result in the same relative gains across the models.

The possibility of doing small data testing has significant implications on manual and automatic architecture search. Researchers or DL systems may be able to iterate on small data sets to find models that can accurately model the structure of the data distribution. Then, these models may be scaled to larger data sets to ensure proportional accuracy gains.

Although small data set testing may be possible, it can be difficult to ensure that training data is large enough to see the power-law learning curve region. It was found that models with poor optimizer parameterization or model priors/initialization show accuracy cliffs, where accuracy is only as good as best guessing, but the model trains on enough data to be in the power-law region. Researchers should take great care when defining a "large enough" training set for small data testing.

Computational Limits: Having identified a desirable model to scale to larger training sets, a next potential limitation is the speed of computation. In some cases, training large models on very large data sets would take months or years of critical path compute time, making these training runs impractical for any real-world problem on existing systems. However, predictable learning and model size curves may offer a way to project the compute requirements to reach a particular accuracy level. The compute requirements could inform decisions about how to scale computational capacity to unlock these compute-limited applications.

After reviewing the tests performed for this work, it was found that compute limitations for the largest data sets of each application domain have been reached. Most frequently, GPU memory limits were reached when trying to train the largest models on the largest data sets. In many cases, these issues may be alleviated with techniques like data or model parallelism, though they may require significant software changes to reduce per-compute-unit memory requirements. Alternatively, training could be migrated to systems with more memory. Further, the longest running training sessions have taken as long as 6 weeks to converge. Parallelism and hardware improvements to reduce this time are highly desirable.

Running into Irreducible Error: If the irreducible error region is approached in real applications, improving accuracy may require techniques outside the straightforward recipe. As an example, reaching Bayes error for a problem would be an indicator that no further information can be extracted from the existing data set—the application might be considered "solved." If further model architecture search, training set growth, or computational scale cannot improve accuracy, it is likely that models are achieving the irreducible error. To improve error beyond this irreducible level may require techniques that could increase the information content of the data to distinguish between the samples that contribute to the Bayes error.

It may be difficult to assess whether one has reached irreducible error or if models just have inherent bias that makes them unable to resolve more information from the data. One approach might be to estimate the human error rate for the task. As long as humans are constrained to the same data for the problem, their best-case accuracy may be a reasonable upper bound on the irreducible error. If humans can perform better than current models, it is likely that models could be improved.

4. Hardware Design Implications

Since predictable learning and model size curves can offer a way to project the compute requirements required to reach a particular accuracy level, they can also help hardware developers predict the needs of deep learning hardware users.

Deep Learning Hardware Design: First, there is a close tie from compute operation rate (e.g., floating point operations, or "FLOPs") to model accuracy improvements. Power-law learning curves and model size growth indicate that each new hardware generation with improved FLOP rate can provide a predictable step function improvement in relative deep learning model accuracy. Further, the different learning curve and model size growth exponents can act as an indicator of the computational scalability of different application domains. Different application domains will see varying benefits from improved FLOP rates, which can help prioritize the domains that should be targets for improved compute throughput.

Second, as new model architecture features emerge for deep learning applications, hardware designers can estimate the importance of accelerating these new model features. Suppose the new model feature runs very slowly on current hardware, and as a result, throughput is not sufficient for the new model architecture to improve state-of-the-art (e.g., a new non-linearity not supported by current floating-point function units). Implementing the new feature in hardware might be costly, and the resulting performance improvements might not provide the required throughput to achieve necessary model accuracy to improve the state-of-the-art. Hardware designers could estimate the throughput of a hardware implementation and the resulting model accuracy gains to weigh them against the benefits of other hardware components.

The Performance-Accuracy Trade-off: Many deep learning software and hardware techniques impose a trade-off between model accuracy and the speed of computation. Learning curves and model size growth can indicate whether these techniques could regain lost accuracy by improving the speed of computation. For example, low-precision computation/quantization and sparse models give up some model accuracy (e.g., up to 20%) in order to improve compute throughput. If the compute throughput improvements allow deep learning developers to train larger models on larger data sets, these accuracy losses might be easily recoverable.

F. Characterizing and Projecting Computational Requirements to Train Target Applications 1. Introduction In one or more embodiments, the teachings of the present patent document may be leveraged to project data and model size scaling required to advance DL accuracy beyond human-level. Presented herein are embodiments for characterizing and projecting the growth in computational requirements to train target applications. Although some DL applications are computationally well-understood, the broader analysis presented herein reveals surprisingly predictable compute and memory scaling across a range of very different DL architectures, including deep convolutional networks (CNNs), recurrent sequence-to-sequence models, and recurrent encoder-decoder models with attention.

The characterizations herein reveal an important segmentation of DL training challenges. While some have focused heavily on CNNs, their compute requirements differ significantly from recurrent neural networks (RNNs), which are likely to demand far more compute and memory resources. Image processing applications with deep CNNs desire relatively small growth in data set and model size, and they show more potential to leverage emerging compute accelerators with high compute-to-memory throughput ratios. Even small batch sizes can expose sufficient operational intensity for high compute throughput.

On the other hand, RNNs, especially in language domains, will require upwards of 100× more training time to achieve target accuracy. They have moderate operational intensities, and very large memory footprints that exceed current accelerator memory capacity by 8-100×. These characteristics make it difficult to efficiently parallelize large-scale training. Systems for RNN training could be substantially different than emerging hardware. For example, a possible approach to better support large-scale RNN training parallelism would be to significantly increase accelerator memory capacity. Growing accelerator compute throughput may also be better leveraged by building larger on-chip caches to avoid excessive memory data streaming for large matrix multiply operations. These approaches run counter to emerging accelerator designs.

2. Compute Graphs of Deep Learning Applications

This section describes the general algorithmic structure of DL applications. Deep learning applications are usually structured algorithmically as compute graphs. These compute graphs include nodes, or "ops," that perform a mathematical computation—e.g., matrix-vector multiplication, convolution, or pointwise operations—on input data. Boxes in network diagrams typically represent ops or groups of ops. Data is passed between ops using "tensors" (like data arrays) that encode the data's structure and dependencies between ops.

To project future hardware needs, four properties of the compute graphs are defined that allow one to characterize compute and memory requirements. In practice, when executing a compute graph on hardware, numerous hardware factors affect performance and are difficult to model (e.g., memory/cache hierarchy, addressing modes, kernel optimization). Rather than trying to model each of these factors for all kinds of hardware, it was chosen herein to define algorithmic compute requirements, which are independent from particular choices of hardware:

Algorithmic FLOPs are the number of floating point operations per second ("FLOPs") required to perform the mathematical calculation of a compute graph op (note: either floating point or integer arithmetic). For example, algorithmic FLOPs include the multiplies and accumulations in a matrix multiply op. In one or more embodiments, algorithmic FLOPs do not include other instructions executed by hardware to perform the computation, such as address, loop invariant, or branch target calculations. Hardware instructions that are not counted in algorithmic FLOPs are likely to account for at most constant overhead per algorithmic FLOP.

Unlike more general applications, DL compute graphs also perform backward propagation ("backprop") of gradients from the model's predictions. Ops in a DL compute graph are differentiable, so that the gradient of each input can be calculated when given gradients of the outputs. After backprop, accumulated gradients are used to update weights and improve the model's predictions. A compute graph's backprop has highly analogous ops to the forward graph traversal, but it splits gradients to flow to model weights and to activations. The backprop for matrix operations usually has twice the algorithmic FLOPs as the forward traversal.

Analogously, an op's algorithmic bytes accessed may be defined as the total memory bytes that an op must read as inputs and write may be defined as outputs to perform the operation. Algorithmic op bytes do not include intermediate data or other memory that might be used to perform the operations, and ignores hardware effects such as caching.

Analogously, algorithmic memory footprint may be defined as the minimum number of memory bytes that must be allocated to allow a training step to execute on an accelerator. More precisely, it is the minimum of the maximum memory capacity required to accommodate all active tensors during any correct topological traversal of the compute graph.

Finally, algorithmic IO counts the amount of data accessed for input to and output from a model. Training data is often stored on disks, read from the disk, and placed into the model's input memory allocations. Algorithmic IO is proportional to the batch size but stays fixed as model size and training step compute requirements grow. Algorithmic IO is expected to grow very slowly relative to compute.

3. Application Accuracy Scaling

The DL community has progressively increased data set and model sizes, and the future system demands of DL training will continue to grow. An objective herein is to project the computational requirements of future DL applications based on applications expected growth. Application-level characteristics may be projected using analytical models that show the relationships between DL data set size, model size, and model accuracy. Given desirable accuracy targets, the analytical models may be used to predict the data set and model sizes required to achieve the target accuracy. Compared to current state of the art, deep learning domains would like 33-971× as much data and 6.6-456× larger models.

a) Motivation to Grow Data and Models

The deep learning community has continually grown data sets, with open-source sets larger than 10's of GBs, to increase modeling task difficulty and model accuracy. Industry is already using significantly larger data sets. Some of Baidu's recent work uses speech recognition data sets of multiple terabytes. Such data sets of interest to the deep learning industry are upwards of 5 terabytes (TB), or about 50×+ larger than current publicly available data sets.

As data sets grow, deep learning models also grow to fit the larger data sets, and industry is aiming for very large models. Projections indicate models will easily reach into the 100's of billions of parameters. Such models would be 10-500× larger than deep learning models described in current research.

b) Accuracy Scaling with Training Data Growth

As shown herein on real data sets, deep learning model accuracy improves predictably with training data set size. It has been further shown herein that the model size required to fit the data grows predictably with data size. Industry can use these empirical models to estimate the amount of training data and model sizes required to achieve a particular model accuracy.

As the sketch of a model's learning curve in FIG. 9 shows, the prediction error reduces as data sets grow, particularly in the power-law region of the curve. The power-law region of the curve is where each new training sample offers information to help models improve predictions on previously unseen samples. Note that error declines predictably.

As noted previously, in the power-law region, where most existing large-scale data applications are currently, model generalization error scales roughly as a power law:

$$\varepsilon(m) \approx \alpha m^{\beta_g}$$

As noted previously, m is the number of samples in the training data set, and $\alpha$ and $\beta_g \in [-0.5, 0]$ are constants that depend on the structure of the modeling task. $\alpha$ represents aspects of the input data space and the DL model architecture. $\beta_g$ is the power-law exponent and indicates the difficulty for models to learn more information from each additional training example. $\beta_g$ closer to $-0.5$ means models can learn quickly from smaller data sets. TABLE 1 (see FIG. 18, 1800-T1) lists estimates of $\alpha$ and $\beta_g$ for different modeling tasks.

Thus, to extend this understanding of model's learning curve to predict the required data and model size from these models, one should define accuracy targets that would be desirable for DL-enabled products. The "Desired SOTA" column of TABLE 1 reflects these projections. For example, word and character LM desired SOTA are near estimated lower bounds on the entropy of English text. Finally, given these analytical learning curves and target error rates, the analytical models may be solved for the required data size to realize the target. The "Projected Scale" columns in TABLE 1 show the relative data size projections. Desired SOTA values are 1.4× to 3.9× better than current SOTA values. However, the amount of data required to achieve these values range from 33× more for speech recognition to 971× more for character LMs. Language domains seem to require the most data due to their poorer power-law exponents, $\beta_g$.

c) Model Size Scaling with Training Data Growth

As data sets grow in size, models should also grow in size to represent the data. As noted herein, model sizes required to fit varying training set sizes are presented. As noted previously, model parameters (roughly capacity) are expected to grow sublinearly in the training set size with the following form:

$$p(m) \approx \sigma m^{\beta_p}$$

Here, m is the number of samples in the training set, and $\sigma$ and $\beta_p \in [0.5, 1)$ are constants that depend on the problem structure. Models should grow parameter count more slowly than the training set (i.e., $\beta_p \leq 1$), or one could just store the data set rather than training a model. Deep neural network model capacity—the volume of concepts (data) it can learn—grows with O(lp log p), where l is a measure of the model's depth. Loosening this bound slightly, model size should grow at least with a square root of the data set size (i.e., $\beta_p \geq 0.5$).

TABLE 1 shows empirically collected $\sigma$ and $\beta_p$ for the deep learning domains. Given the target data size determined in the last subsection, the model sizes required to fit the target data set sizes is projected. The model scale column shows the relative required increase in model size. For example, current SOTA word LMs use roughly 1 B parameters to fit roughly 1 B word data sets. Thus, to fit a 100× larger data set, a model would require ~23 B parameters (23-92 GB, depending on weight precision).

4. Characterizing Compute Requirements

Given an idea of desirable data and model sizes, the computational requirements to train these very large models may be characterized. This section characterizes metrics such as deep learning application compute FLOP, memory access, and memory footprint growth. Although the structure of deep learning applications is intricate, their training requirements scale mostly predictably. Compute and memory usage grow asymptotically linearly with model size and batch size. Also, provided herein are accessible first-order models of compute requirements not characterized in prior work.

a) Methodology

Figure 12:
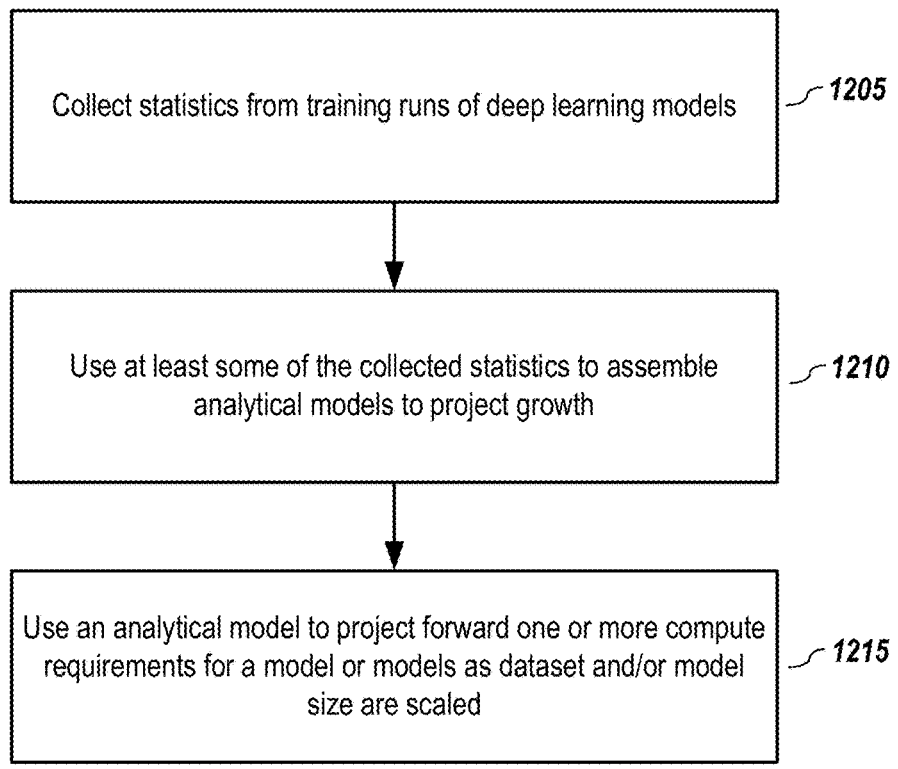
FIG. 12 depicts a general methodology for predicting one or more compute requirements, according to embodiments of the present disclosure.

FIG. 12 depicts a general methodology for predicting compute requirements, according to embodiments of the present disclosure. In one or more embodiments, model training compute requirements may be estimated by collecting (1205) statistics from training runs and assembling (1210) analytical models to project growth. In embodiments, training was performed with Tensorflow 1.5.0 running on NVIDIA GPUs by Nvidia Corporation based in Santa Clara and using a modified version of TFprof. TFprof annotated compute graph ops to calculate their algorithmic FLOPs and bytes, and collected run time as they execute. At the end of a training step (i.e., a compute graph traversal), TFprof returned this profile for all ops executed during the step, ensuring that even fine details of an end-to-end training step were profiled. Tensorflow's memory allocators were also queried for the maximum amount of training step memory allocated—the memory footprint.

Profiles from 100-500 non-sequential training steps were collected to account for per-training-step differences in FLOPs and memory accessed for different models. For instance, character LMs, NMT, and speech models unroll their recurrent layers for the time-steps required for the longest batch sample. This unrolling results in variable computation and memory access in separate training steps, so the profiled results were averaged over the training steps.

One of the most complicated variables to control for is training batch size—the number of data parallel samples to observe in a single training step. Batch size can be set arbitrarily, but particular batch sizes result in best model accuracy depending on data set size. SOTA models for all of the tested domains in this patent document have best batch sizes that exceed the maximum memory capacity of GPUs on which the models were trained. It is likely that future DL training will also be constrained by per-compute-unit memory capacity, suggesting that ML researchers will choose per-compute-unit batch sizes (henceforth, "subbatch size") that can provide near-peak utilization of compute unit resources. Herein profiling was done with the smallest such subbatch size.

To grow models, hyperparameters were changed that have the largest effect on the ability for the model to fit larger data sets as measured by generalization error. For ResNets, increasing depth and convolution channels, rather than filter sizes, improved accuracy the most, so profiles were collected for deeper and wider image classification networks. Most recurrent models have already grown to a depth such that increased depth results in no accuracy improvement. Instead, the number of hidden nodes per layer were increased. Finally, an aim was to project forward the compute requirements (1215) for models as data set and/or model size are scaled up. The analytical models of application characteristics use first-order approximations to provide the community with a concise set of formulas for projections. However, higher fidelity modeling may also be used to verify these results.

b) Estimating Training Step Algorithmic FLOPs

For DL models, the number of FLOPs per training step grows roughly linearly in the number of parameters of the model. This observation suggests that most DL applications operate on most model parameters the same number of times in a single training step. This observation may be demonstrated analytically for word LMs next.

Again, let p be the number of model parameters for a LSTM word LM, and let $p_{em}$, $p_{re}$, and $p_o$ be the parameters in embedding, recurrent, and output layers, respectively. The total model parameters may be approximated as:

$$p = p_{em} + p_{re} + P_o \approx hv + 8h^2l + hv = 8h^2l + 2hv$$

Here, v is the LM's vocabulary size, h is number of hidden units per recurrent layer, and l is the number of layers.

Next, the roughly linear relationship between parameters and FLOPs per step is shown. Since backward propagation adds ~2× the number of FLOPs, regardless of the model, only the forward propagation was considered. For this first-order model, it was assumed that most compute FLOPs come from the subset of ops that perform vector or matrix operations. Forward propagation algorithmic FLOPs may be estimated as:

$$c_{fwd} = c_{em} + c_{re} + c_o \approx 0 + 16lqh^2 + 2qvh = q(16h^2l + 2hv)$$

Here, q is the sequence length for the training step (subbatch size was ignored to normalize per training sample). These models indicate that $$\lim_{h \to \infty} \frac{c_{fwd}}{p} \to k,$$

a constant. Thus, it is expected that for word LMs and similarly structured recurrent models, compute FLOPs should grow roughly linearly in the increase in number of model parameters.

Figure 13:
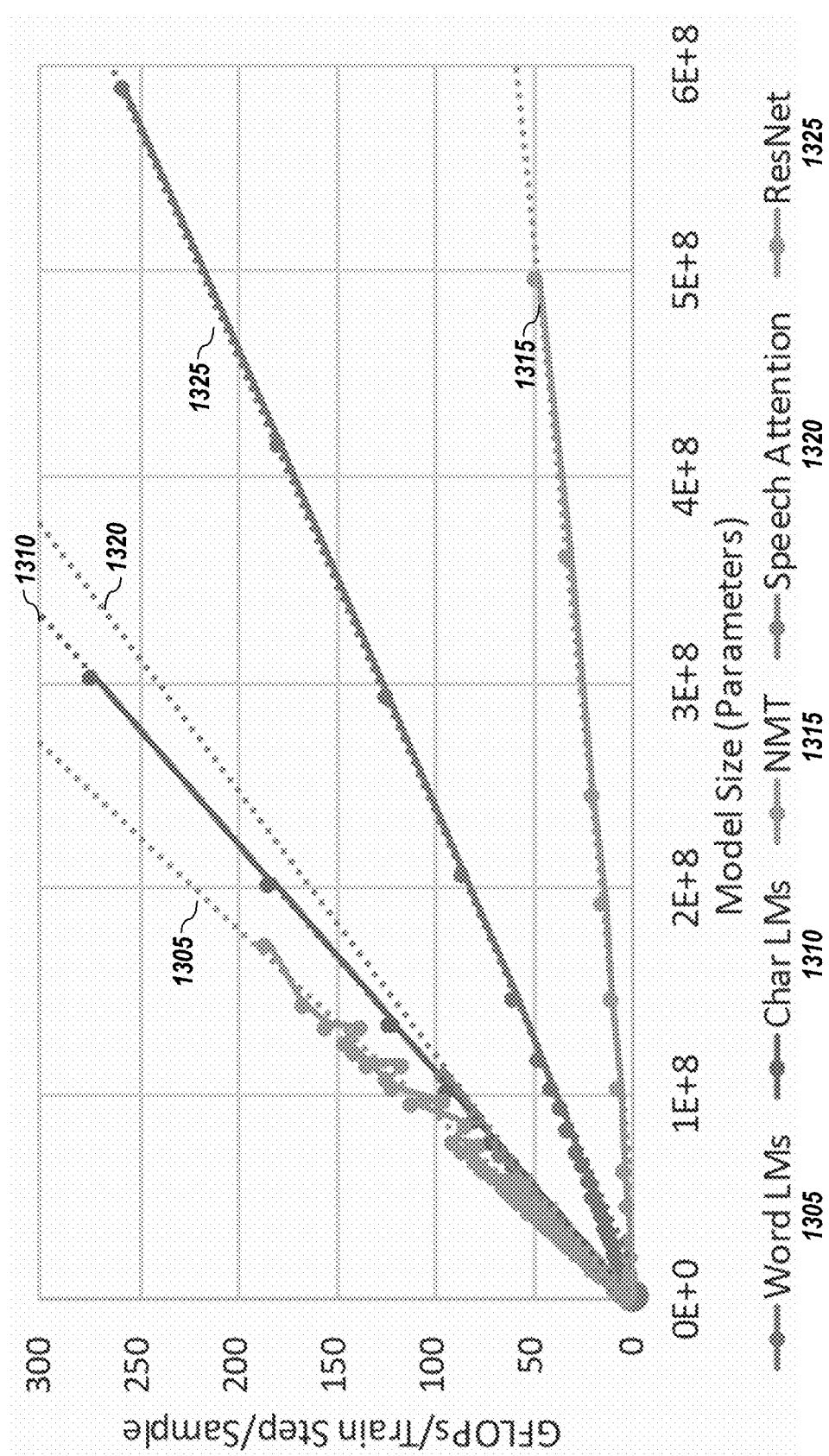
FIG. 13 depicts per-training sample floating point operations per second (FLOPs) growth with number of model parameters (dotted lines are trends), according to embodiments of the present disclosure.

This linear relationship was confirmed between model parameters and algorithmic FLOPs per training step empirically across a set of applications. FIG. 13 plots the TFprof-profiled growth in algorithmic FLOPs (note: batched training roughly multiplies these values by the subbatch size), according to embodiments of the present disclosure. Each domain's algorithmic FLOPs grew linearly with model size above 30-100M parameters—moderately large models. FLOPs per parameter ranges from 149 for NMT to 1111 for ResNets. For recurrent networks, as sequence length grows, the FLOPs/parameter also grew, approaching ResNet requirements. Character LMs and speech networks unroll layers for 150 and 300 time-steps, respectively.

TABLE 2 (see FIG. 18, 1800-T2) records the asymptotic hardware requirements for each DL domain as models grow. Given the clear linear relationships between FLOPs and parameter counts, the following linear trend may be used to project the compute FLOPs per training sample ("ct") for models with p parameters:

$$c_t(p) \approx \gamma p$$

Here, $\gamma$ is a constant that depends on the input data shape, recurrent sequence length, and model architecture.

c) Estimating Algorithmic Memory Bytes Accessed

Like algorithmic FLOP counts, algorithmic memory accesses also scale linearly with model parameters across the DL applications. However, since a significant portion of training step memory accesses are from reading or updating model weights—which do not depend on the subbatch size—memory access counts depend, to first-order, on both model size and subbatch size. This section describes an analytical model and verifies that it fits empirical results.

A training step accesses two types of tensors: the DL model and the activation tensors that flow through the model. Hardware loads from and stores to the model parameters roughly a constant number of times each for the forward and backward propagation, and to update the weights at the end of a training step. Similarly, activation memory, with dimensions proportional to the batch size and model dimensions, is accessed roughly a constant number of times. As above, denote p as the model parameter count. Then, total memory accesses for a training step ("$a_t$") takes this first-order form:

$$a_t(p,b) \approx \lambda p + \mu b \sqrt{p}$$

Figure 14:
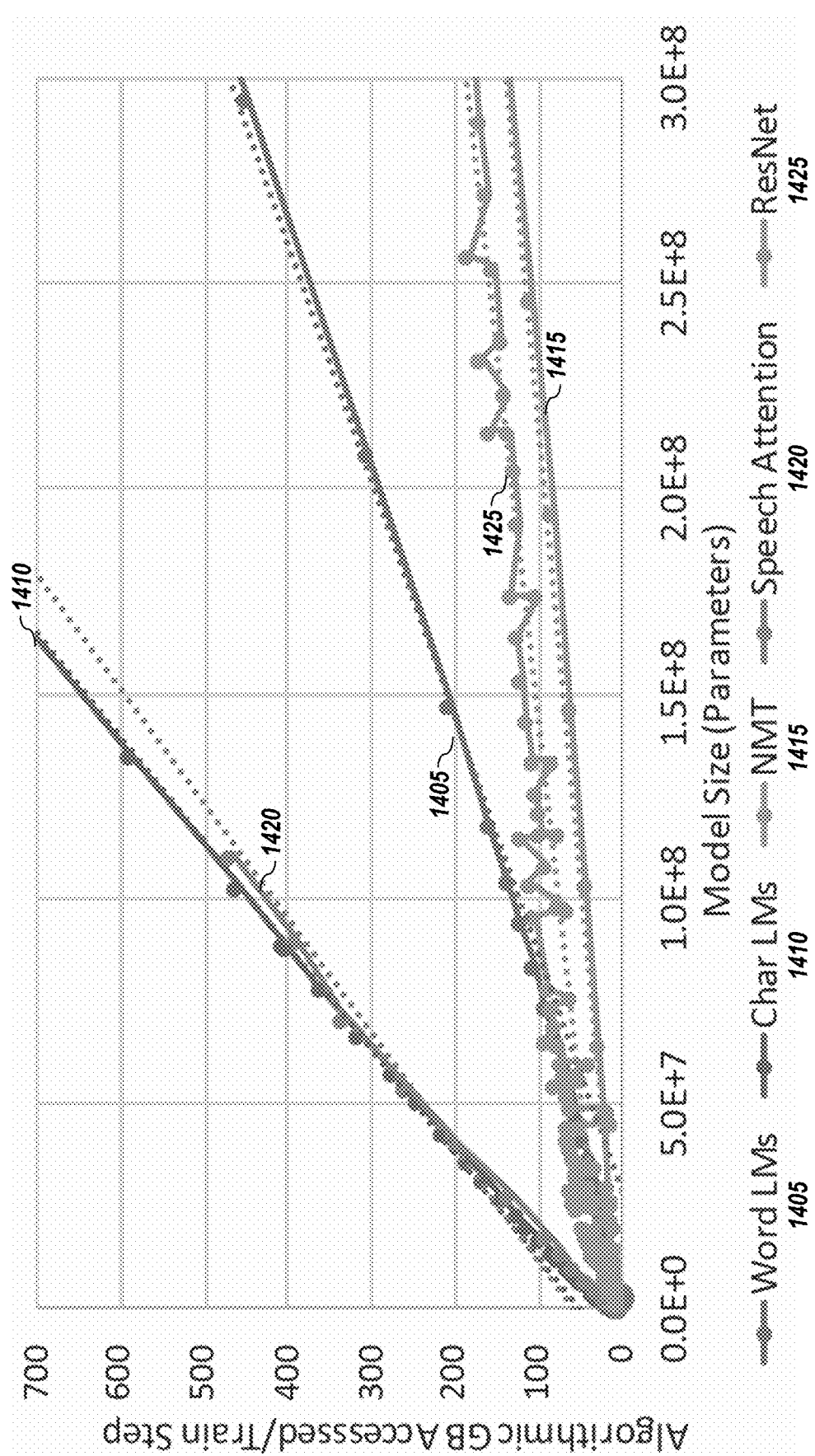
FIG. 14 depicts TFprof algorithmic memory access as model size grows (note: for particular subbatch sizes), according to embodiments of the present disclosure.

Here, $\lambda$ and $\mu$ are constants that depend on input data shape, recurrent sequence length, and model architecture. The $\sqrt{p}$ term approximates the model's hidden layer node or channel counts—one dimension of the compute graph's large linear algebra operations. It was found that $\sqrt{p}$ is a good approximation for all domains, with a small caveat: For models with many parameters to embed input data (e.g., the larger vocabularies of word LMs and NMT), $\sqrt{p}$ overestimates hidden dimension until the hidden dimension is large relative to the embedding dimension. FIG. 14 curves show nearly linear asymptotes, according to embodiments of the present disclosure.

d) Estimating Training Operational Intensity

Conveniently, although model training steps comprise many ops, their algorithmic FLOPs and memory access characteristics are strikingly similar to those of a single large linear algebra operation. As a result, operational intensity—the ratio of FLOPs to memory bytes accessed—takes form familiar in linear algebra kernel optimization.

Algorithmic operational intensity for each DL model is listed in TABLE 2. A model's ops that contribute the most to FLOPs and memory accesses are often matrix operations with dimensions related to the hidden dimension (~$\sqrt{p}$) and subbatch size. The operational intensity of a matrix multiplication with dimensions (b×$\sqrt{p}$)($\sqrt{p}$×$\sqrt{p}$) is b$\sqrt{p}$/(2$\sqrt{p}$+4b), the same form as the end-to-end training step operational intensities listed in TABLE 2.

Figure 15:
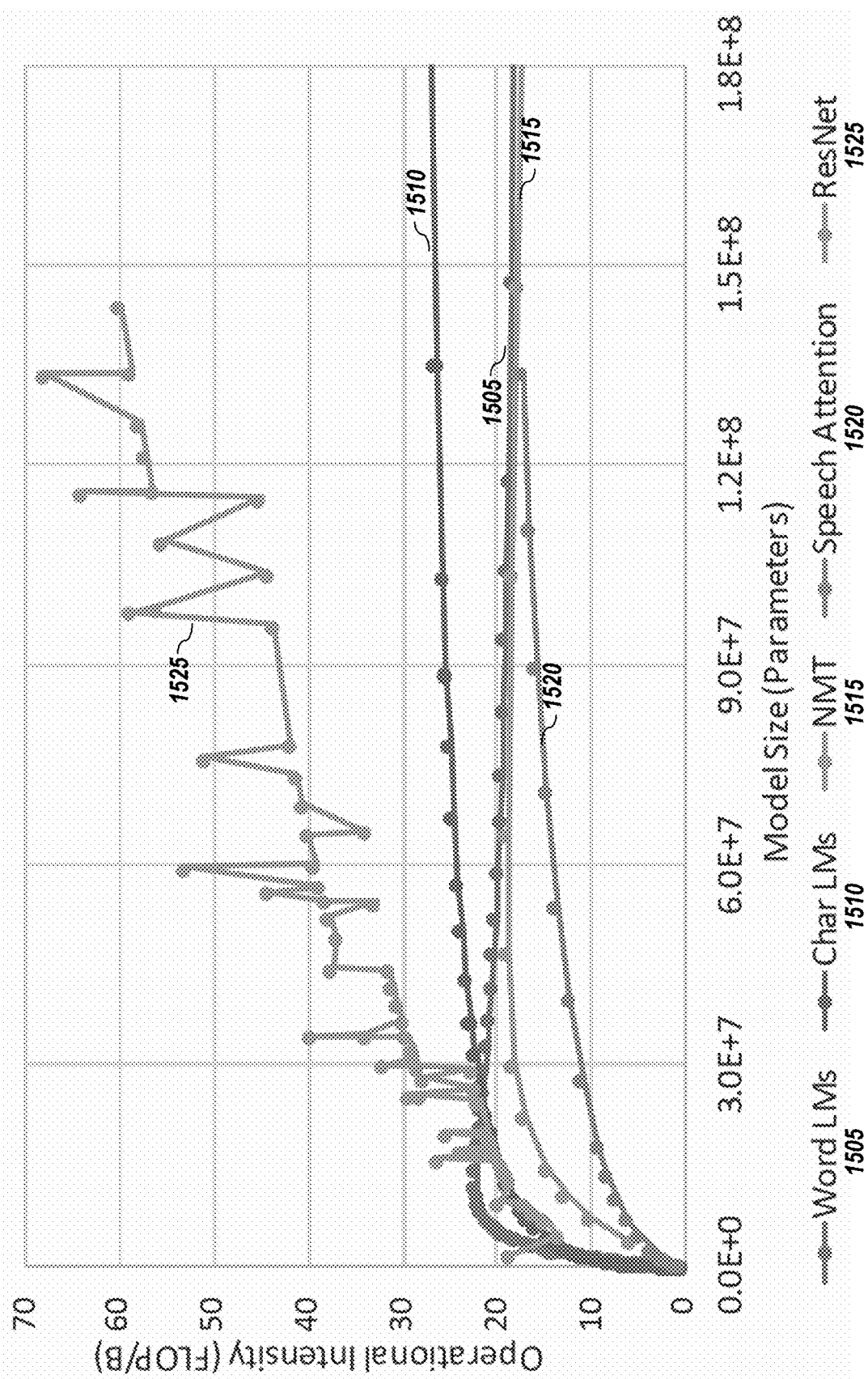
FIG. 15 depicts TFprof algorithmic operational intensity as model size grows (note: fixed subbatch size), according to embodiments of the present disclosure.

As a result of its form, operational intensity will approach some fixed upper bound unless both a model's hidden dimension and the subbatch size grow. When either model size or subbatch size is fixed, it will asymptotically approach the ratio of the slopes of algorithmic FLOPs and bytes growth. FIG. 15 shows the leveling of operational intensity for fixed subbatch size as model size grows for each application.

e) Estimating Training Step Memory Footprint

Figure 16:
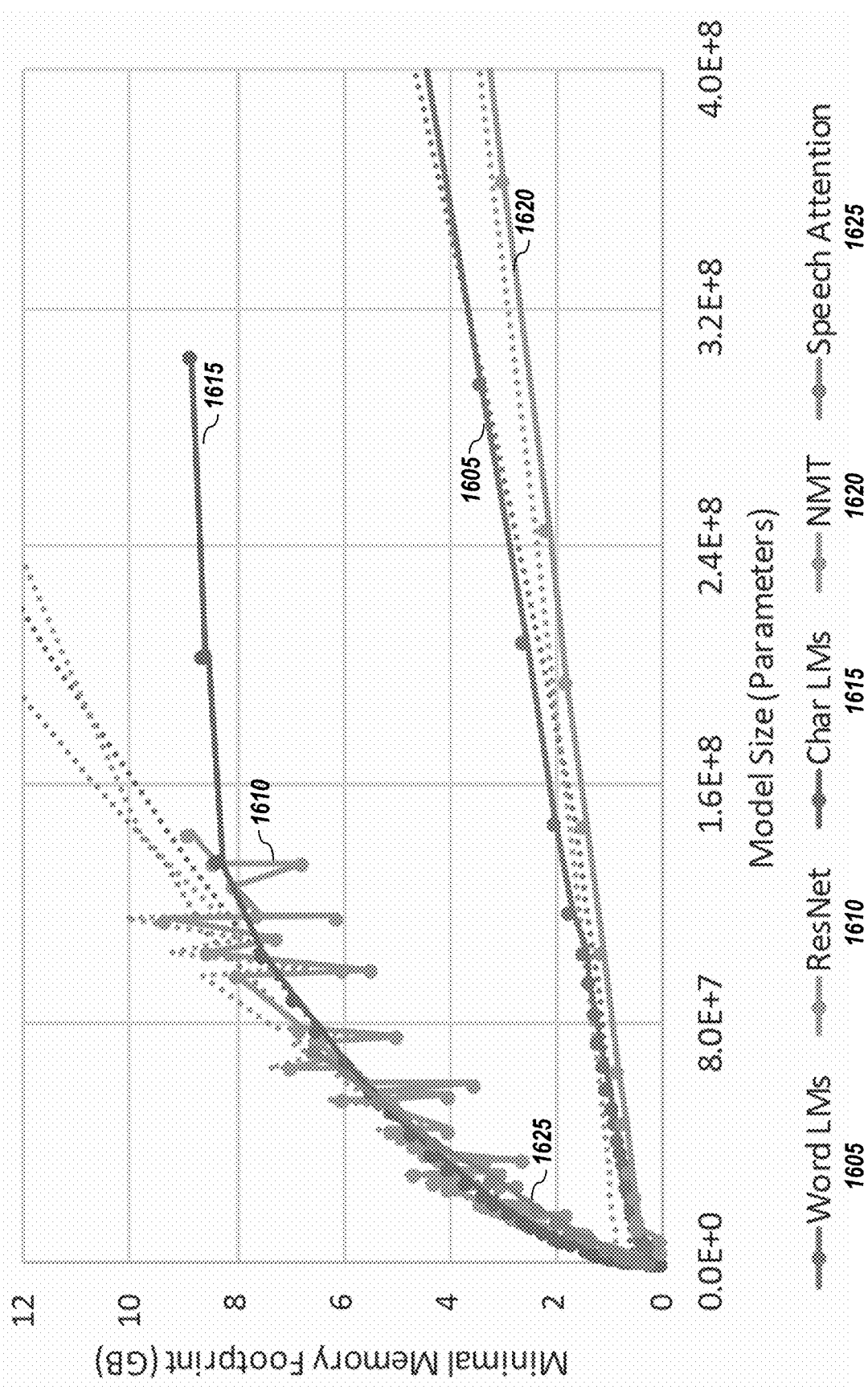
FIG. 16 depicts empirical and asymptotic minimal memory footprint as model size grows, according to embodiments of the present disclosure.

Memory footprint is the measure of the memory capacity required to execute an algorithm. Tensorflow's memory allocator provides a footprint estimate, but minimal memory footprint is also estimated by tracking it through a topological traversal of the compute graph. For each op, DL frameworks can allocate memory for the op's output tensors, and after executing the op, free the op's input tensors if all the tensor's consumer ops have executed. FIG. 16 plots the Tensorflow allocator memory footprints for each model and the topological estimates, according to embodiments of the present disclosure. These values agree up to the point that the Tensorflow runs out of GPU memory capacity (80% of 12 GB). At that point, the allocator starts swapping GPU memory to the CPU's memory space, where it no longer counts the memory as part of the footprint. When Tensorflow does not swap memory, the models tend to slightly overestimate minimal memory footprint; Tensorflow optimizes to perform some ops on tensors in-place rather than allocating separate output tensors.

Minimal memory footprint grows asymptotically linearly with model size for larger models. This trend is expected given that the model's parameter memory is persistent, while activation tensors can be freed and reused by the framework.

Minimal footprint can be modeled linearly:

$$f_t(p) \approx \delta p$$

Here, $\delta$ is a constant dependent on the input data shape, recurrent sequence length, and model architecture. This first-order approximation fits well for parameter counts above ~500M, but for the projections in the next section, it was opted to use more accurate topological traversal estimates.

Language model footprint growth is similar across the domains; character LM footprint growth slows significantly for large models (not depicted in the figure). Speech and image domains show faster memory footprint growth with model size. However, as the next section shows, speech and image domains need much smaller networks to achieve accuracy targets, so their footprint requirements are modest.

5. Projecting the Accuracy Frontier

Here the compute resources required to train models to target accuracy levels are projected. A hypothetical Roofline estimate of model training time are also projected and implications of the resource requirements are discussed. Improving speech recognition and image classification should be feasible with existing parallelism strategies. Language domains, however, are likely to require 100× more compute, suggesting the need for both improved algorithmic and parallelism strategies.

a) Projecting Target Compute Requirements

Using the analytical models from the last two sections, the compute resource requirements to reach target accuracy levels were projected. TABLE 3 (see FIG. 18, 1800-T3) lists the projected data and model size, the choice of subbatch sizes (Section F.5.b.ii), and projected training requirements.

It was expected that image processing networks will require the least growth in algorithmic FLOPs and memory access per training step to achieve aggressive accuracy targets. Their required model growth is small relative to recurrent networks, and their convolutional layers offer high operational intensity to utilize compute resources with smaller subbatch sizes. The clearest contrast is with speech recognition, which would require similar model size as image classification, but its larger subbatch size means more FLOPs and memory access per training step. These results suggest it may be easier to parallelize very large image network training by sharding full batches across many accelerators.

The projected compute requirements also witness the challenges of scaling language domains specifically, and recurrent networks in general. To reach target accuracy on language and speech domains will require 2.5-1200× more FLOPs and memory access per training step than image classification.

In language domains, these increases are largely due to the model size growth required to fit larger data sets. Finally, it should be noted that all domains are likely to require significantly more memory capacity than available with current accelerators. Current GPUs and Google's TPU v2 have 16 or 32 GB of memory per accelerator chip. Running any of these models on such accelerators will require either model-level parallelism to split portions of the models across multiple accelerator's memories or migrating model parts into and out of accelerator memory—an expensive operation.

b) Projecting Run Time on Hardware

Next, the hypothetical best-case run times for each of the target applications running on an accelerator were estimated. Presented below, a target accelerator is configured, the process for choosing the training step subbatch size is described, and then the run time is estimated. The estimates use the Roofline model to predict the overall system throughput given the full-graph algorithmic FLOPs and memory accesses.

TABLE 4

Target Accelerator Configuration

| Component | Configuration |
| --- | --- |
| Compute Throughput, 32-bit ($x_c^{32b}$) | 15.67 TFLOP/s |
| On-chip Cache | 6 MB |
| Memory Bandwidth ($x_a$) | 898 GB/s |
| Memory Capacity (off-chip) | 32 GB |
| Inter-device Bandwidth | 56 GB/s |

TABLE 4 shows the configuration for a target accelerator similar to NVIDIA's V100 version 2. A maximum achievable throughput of 80% of peak FLOPs and 70% of peak memory bandwidth, consistent with existing hardware, was assumed. The accelerator's compute intensity inflection point between memory-bound and bandwidth-bound (its Roofline "ridge point") was 17.4 FLOP/B, but given peak achievable throughput, rose to 19.9 FLOP/B. It was assumed initially that the accelerator has infinite memory capacity and is able to fit the memory footprint for a training step of any model.

(i) Subbatch Size: Minimize Per-Sample Time

Choosing an appropriate subbatch size for model training can be a difficult process that depends on many aspects of the DL application. Here, a focus is on the hardware trade-offs: one may want to ensure good utilization of the accelerator while keeping a small memory footprint. Three subbatch size points-of-interest were identified, and it is shown that the smallest size that minimizes per-sample latency (i.e., maximizes throughput) provided the best trade-offs.

Figure 17:
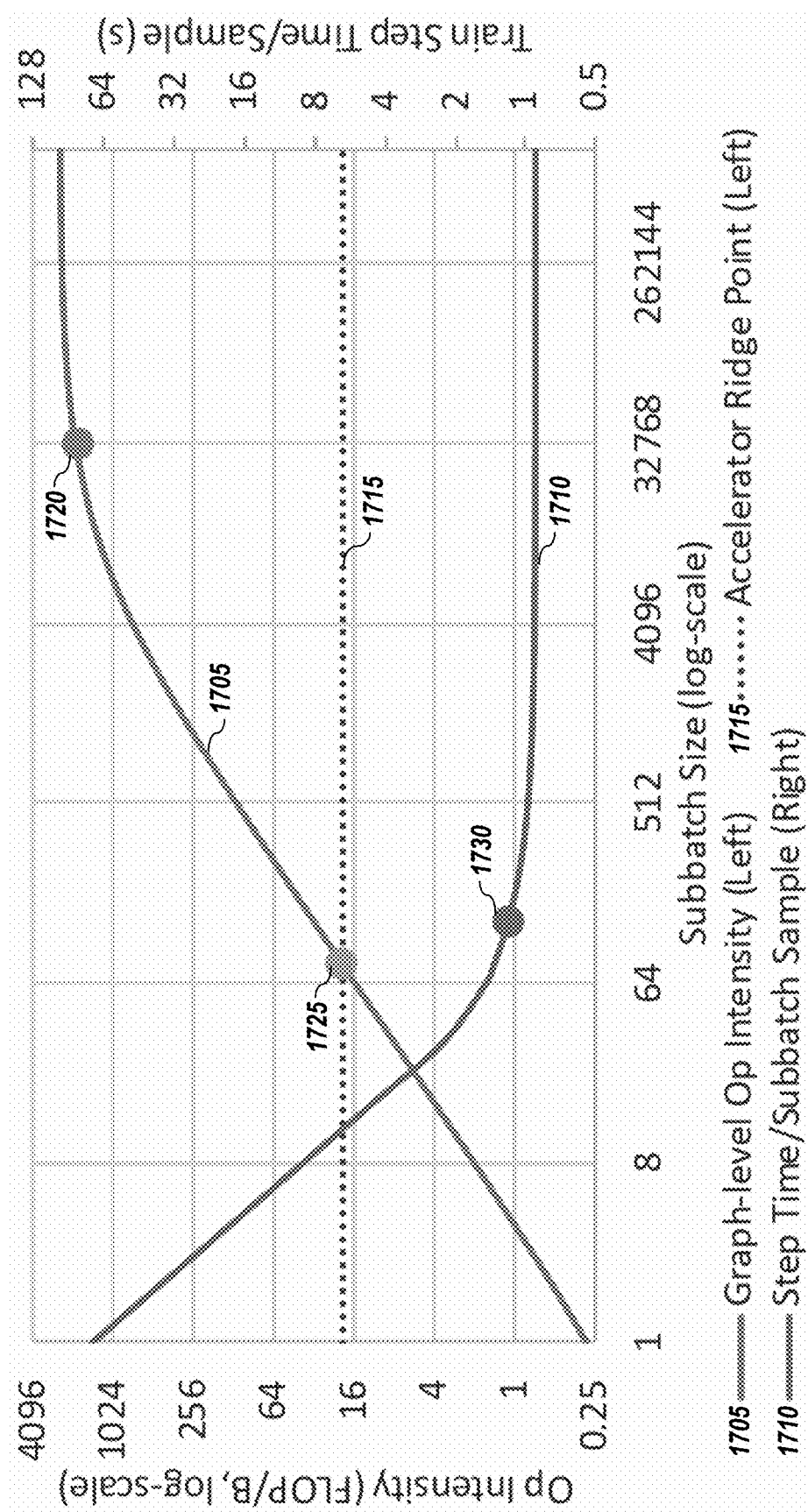
FIG. 17 depicts subbatch size effect on word language model (LM) operational intensity, training step time per sample, according to embodiments of the present disclosure.

FIG. 17 shows the effect of subbatch size on the graph-level operational intensity and the training step time per-subbatch-sample, according to embodiments of the present disclosure. Note marginal run time gains for op intensity higher than accelerator ridge point. One could choose subbatch size such that the graph-level operational intensity nears saturation (marker 1720), giving the most opportunity to utilize the accelerator's compute throughput. However, this point also requires a very large memory footprint, often 5-20× more than a small subbatch. Another option is subbatch size such that the graph-level operational intensity matches the accelerator's ridge point (marker 1725). In practice, however, this point does not optimize the accelerator's compute throughput—many ops are still memory-bound. The training step time-per-sample curve (curve 1710) shows 40% throughput loss.

Instead, in one or more embodiments, the subbatch size that minimized the training step time normalized per-sample was preferred. The point 1730 on curve 1710 in FIG. 17 is a subbatch size that keeps memory footprint small while achieving 79% of the peak compute throughput. This approach was used to estimate best subbatch sizes for each domain in TABLE 3. For recurrent networks, subbatch size settled at about 1.5× larger than the point where graph-level operational intensity matches the accelerator's ridge point.

(ii) Per-Epoch Run Time

Finally, a best-case run time was estimated using a Roofline model—performance is bounded either by the accelerator's compute ($x_c$) or memory access ($x_a$) throughput:

$$r_t(x_c, x_a) = \max\left(\frac{c_t}{80\% \cdot x_c}, \frac{a_t}{70\% \cdot x_a}\right)$$

Training step time are listed in TABLE 3, and these are projected out to the training time for one epoch. These estimates were also used for selecting subbatch sizes. Although optimistic, these training time projections show that the target accuracies for image classification and speech recognition may not be far out of reach. A single epoch would take ~3 months on a single accelerator. Reducing epoch time to less than a day would require parallelizing training over ~100 accelerators.

G. Some Conclusions

The deep learning community has created impactful advances across diverse application domains by following a straightforward recipe: search for improved model architectures, create large training data sets, and scale computation. While model architecture search can be unpredictable, the model accuracy improvements from growing data set size and scaling computation are empirically predictable. It is empirically validated herein that deep learning model accuracy improves as a power-law as training sets grows for state-of-the-art model architectures in four machine learning domains: machine translation, language modeling, image processing, and speech recognition. These power-law learning curves exists across all tested domains, model architectures, optimizers, and loss functions. Further, within each domain, model architecture and optimizer changes only shift the learning curves but do not affect the power-law exponent—the "steepness" of the learning curve. It was also show that model size scales sublinearly with data size. These scaling relationships have significant research, practice, and systems implications on deep learning progress.

H. Appendix A—Detail on Tested Machine Learning Domains

Based on the results presented in this patent document, the power-law data-generalization behaviors of each machine learning domain appear to be due to the structure of the problem domain. This section reports definitions of input and output spaces, optimized, and reported loss functions for each machine learning domain, and other information that may be used to predict the data-generalization and model size scaling. Additionally, to show the breadth of the testing, TABLE 5 summarizes the different domains, model architecture features, optimization and loss functions that were tested herein.

TABLE 5

Breadth of domains, model features, optimizers, loss functions tested

| Domain | Model | Model Features | Optimizer | Loss Function | Exponent |
|---|---|---|---|---|---|
| Machine Translation | LSTM | Encoder-decoder with attention, with and without dropout | Adam | Token Error | −0.128 |
| Word LMs | LSTM | GEMMs, σ+tanh non-linearities | SGD | Xentropy | −0.066 |
|  | RHN | GEMMs, σ+tanh non-linearities | SGD | Xentropy | −0.070 |
| Char LMs | RHN | GEMMs, σ+tanh non-linearities | SGD, Adam | Xentropy | −0.094 |
| Image Classification | ResNet | Feed-forward, CONV blocks, pooling and skip connections | Nestero Momentum | Classify Error | −0.309 |
|  |  |  |  | X-entropy | −0.350 |
| Speech Recognition | D52 | Bi-LSTM, CTC loss | Adam | CER | −0.299 |
|  | Attention | Bi-LSTM, CONVs, attention layer | Adam | CER | −0.296 |

1. Neural Machine Translation

Given input and output vocabularies, $V_S$ and $V_T$, NMT models learn a mapping $D_S \rightarrow D_T$ where D.=V.* (Kleene star). In this work, a word-piece vocabulary shared between the source and target languages is used. After applying pre-processing methods (i.e., clean-up and byte pair encoding uses Tensorflow NMT WMT scripts) adopted in many SOTA models, there are 36545 sub-word tokens. UNK and PAD tokens were included for unknown words and mini-batch padding for the source domain (German, $|V_S|=36547$); for the target domain (English), UNK PAD, SOS (start-of-sequence), and EOS (end-of-sequence) are included ($|V_T|=36549$). The German and English sentences in new-stest2016 were on average 27 and 25 tokens long with the longest sequences having 101 and 94 tokens respectively.

During training, cross entropy loss (i.e. the conditional probability of the target sentence given the source sentence) was minimized. The per-token error rate and bits-per-token were reported. Because the reported metrics are per-token measure of the target language, the data set size is given by the number of English tokens in the training set.

2. Language Modeling a) Word Language Models

During training for world language models, sequences were unrolled out to length 80 for backpropagation. Continuous minibatching was also used: At end of one sentence in the data set, we concatenate an end-of-sentence designator, followed by the next sentence from the data set.

Let C be the language's vocabulary. Then, $|C|=10,004$ after special symbols like the unknown token were included. The input space is $I \cup C^i$ where i is the number of words previously seen in a sequence. Continuous minibatching was used, so the effective history length, i, can be very long. The output space is O=C.

Rather than perplexity, normalized cross-entropy loss was used:

$$-\frac{1}{N}\sum_i \ln p_{w_i},$$

where $p_{w_i}$ is the model's predicted probability of seeing the ith token. N is either the number of sequences in a batch for training optimization, or N is the number of predicted words in the validation set.

b) Character Language Models

For character language models, sequences were unrolled out to length 150 characters. Unlike word language models, non-continuous minibatching was used, so some sequences end at an end-of-sentence token. Sequences longer than 150 characters are truncated.

Let C be the language's vocabulary of alphanumeric characters and symbols. Then, $|C|=98$ after special symbols like the end-of-sentence token were included. Similar to word language models, the input space is $I \cup C^i$ where i is the number of characters previously seen in a sequence. Since non-continuous minibatching was used, so the effective history length, i, is at most 150. The output space is O=C.

Similar to word language models, normalized cross-entropy loss was used:

$$-\frac{1}{N}\sum_i \ln p_{w_i},$$

where $p_{w_i}$ is the model's predicted probability of seeing the ith token. N is either the number of sequences in a batch for training optimization, or N is the number of predicted characters in the validation set.

3. Image Classification

ImageNet images were initially scaled proportionally so that the shortest dimension of the image is 256 pixels. During training, these images are cropped to 224×224 as input to the CNN. Input images are 224×224 pixels by 3 color channels of 8 bits each. Thus, the total input space size is $|I|=224*224*3*256 \approx 38.5M$. The output space is 1,000 different object classes that might be contained in the image. For training, the data set was augmented by modifying the brightness, contrast, saturation, and lighting. In addition, the image horizontally was flipped. In embodiments, training and data augmentation was performed using ResNet implementation in TensorPack.

The optimization was for classification cross-entropy loss on each training image, and average validation cross-entropy, top-1, and top-5 classification error were reported. Each loss calculation still followed the power-law. However, it should be noted that top-k classification error (k>1) is not a distance metric; it uses set containment, which is not symmetric. Alternatively, it is a product of distance metrics, which is not necessarily a distance metric.

4. Speech Recognition

The audio input to speech recognition models can be represented as the sequence $x=(x_1, \ldots, x_t)$ of length t. Each $x_i$ is an audio spectrogram over a small time window. Each predicted output is a character, encoded as a one-hot vector, $y_i$, representing the most probable text token at sequence step i. Output sequences are of the form $y=(y_1, \ldots, y_u)$. Models predicted the conditional distribution $p(y|x)$ using an encoder-decoder form. Thus, $p(y|x)=\text{Decode}(\text{Encode}(x), y)$.

a) Deep Speech 2 Embodiments

In DS2 model embodiments, the encoder was represented by a stack of recurrent layers with LSTM cells and the decoder was the connectionist temporal classification (CTC). The CTC loss function computed the conditional probability by marginalizing all possible alignments and it assumed conditional independence between output predictions at different time steps given aligned inputs. An extra blank label, which can be interpreted as no label, was introduced to map h and y to the same length (i.e., an alignment or path). a is obtained by inserting (t'−u) blanks into y. A mapping $\mathcal{B}: a \to y$ is defined between a and y, which can be done by removing all blanks and repeating letters in a.

$$P_{CTC}(y|x) = \sum_{a \in \mathcal{B}^{-1}(y)} P(a|h) \quad (1)$$

$$= \sum_{a \in \mathcal{B}^{-1}(y)} \prod_{t=1}^{t'} P(a_t|h_t) \quad (2)$$

$$P(a_t|h_t) = \text{softmax}(a_t, h_t) \quad (3)$$

b) Attention Model

Similar to the DS2 model, the attention model used a stack of recurrent layers with GRU cells as the encoder. The decoder comprises an attention layer followed by a recurrent layer. The attention mechanism aligned the input sequence to the output sequence. The attention mechanism removed the conditional independence assumption in output sequence that the DS2 model made. More model, attention mechanism, and loss function details can be found in Battenberg et al. (2017).

I. Appendix B—Power-Law Learning Curve For Counting Model Classifier

First, it is shown that the expected generalization error for a counting model decreases as a power-law with the size of number of training samples it observes. This proof inspects the asymptotic rate of convergence of the Glivenko-Cantelli theorem limit. Some machinery:

Let $\chi=\{0, 1\}$ be the input space for a binary coin-flip probability estimator. Let $P_{true}: \chi \to \mathbb{R}$ be the true model probability. To begin, it is assumed that $P_{true}[0]=P_{true}[1]=0.5$ (i.e., a fair coin flip), but the results easily generalize to unfairly weighted coins.

Let the training sets be such that $T_i$, contains i iid (independent and identically distributed) samples from $P_{true}$. Further, let $T_i(x)=\{y \in T_i: y=x\}$ be the subset of samples in $T_i$ equal to x.

To start with, the learning behavior of a counting model was observed, which approximates $P_{true}[x]$ by counting the proportion of training samples in $T_i$ that are equal to x.

Thus, $$P_i[x] = \frac{|T_i(x)|}{i}.$$

Also to start with, let the model loss calculation be $l(P_i[x], P_{true}[x])=|P_i[x]-P_{true}[i]|$ be the L1-norm. This proof sequence can be easily generalized to other loss functions including L2-norm and absolute KL-divergence, and it is empirically validated herein that these norms show the same power-law behavior.

Finally, the total loss function is defined as the weighted average loss per output prediction:

$$L_i := \sum_{x \in \chi} l(P_i[x], P_{true}[x]) * P_{true}(x) \quad (4)$$

Theorem 1. The expected total loss for a counting model trained on $T_i$ sampled from a true distribution fair coin flip is a power-law with exponent −0.5. Specifically, $$\mathbb{E}[L_i] = \Omega\left(\frac{1}{\sqrt{2\pi i}}\right) \quad (5)$$

Proof. First, the $2^i$ possible ordered samples are enumerated as $T_i$, and they are uniquely named as $T_{i,j}$ for j=0; 1, ..., $2^i$−1. Let $P_{i,j}$ be the probability distribution predicted by a counting model trained with the set $T_{i,j}$.

Now, the expectation may be expanded as a sum:

$$\mathbb{E}[L_i] = \sum_{j=0}^{2^i-1} [P[\text{obtaining } T_{i,j}] * L_{i,j}]$$

$$= \sum_{j=0}^{2^i-1} \left[P[\text{obtaining } T_{i,j}] * \sum_{x \in \chi} l(P_{i,j}[x], P_{true}[x]) * P_{true}[x]\right]$$

$$= \sum_{j=0}^{2^i-1} \left[P[\text{obtaining } T_{i,j}] * \sum_{x \in \chi} |P_{i,j}[x] - P_{true}[x]| * P_{true}[x]\right]$$

Exploiting the symmetry of the fair coin flip and plugging in values for $P_{true}$, this may be simplified to:

$$\mathbb{E}[L_i] = \frac{1}{2^i} \sum_{j=0}^{2^i-1} |P_{i,j}[x] - P_{true}[x]|$$

It should be noted that $T_{i,j}=T_{i,k}$ for j≠k if the jth and kth samples each contain the same number of instances of $x \in \chi$. In that case, $\forall x, P_{i,j}[x]=P_{i,k}[x]$. Further, note that there are $$\binom{i}{k}$$

sets, $T_{i,j}$, such that $|T_{i,j}[x]|=k$. This counting argument may be applied to calculate the number $T_{i,j}$ that are equal. Let k be the number of instances of x=0 in each set of training sets:

$$\mathbb{E}[L_i] = \frac{1}{2^i} \sum_{k=0}^{i} \binom{i}{k} \left|\frac{i-k}{i} - \frac{1}{2}\right|$$

$$= \frac{1}{2^i} \sum_{k=0}^{i} \binom{i}{k} \left(\frac{i-k}{i} - \frac{1}{2}\right)$$

$$= \frac{2}{2^i} \sum_{k=0}^{\lfloor\frac{i+1}{2}\rfloor} \binom{i}{k} \left(\frac{1}{2} - \frac{k}{i}\right)$$

$$= \frac{2}{2^i} \sum_{k=0}^{\lfloor\frac{i+1}{2}\rfloor} \binom{i}{k} \left(\frac{1}{2} - \frac{k}{i}\right)$$

$$= \frac{2}{2^i} \left[\frac{1}{2} \sum_{k=0}^{\lfloor\frac{i+1}{2}\rfloor} \binom{i}{k} - \sum_{k=0}^{\lfloor\frac{i+1}{2}\rfloor} \frac{k}{i}\binom{i}{k}\right]$$

$$= \frac{2}{2^i} \left[\frac{1}{2} \sum_{k=0}^{\lfloor\frac{i+1}{2}\rfloor} \binom{i}{k} - \sum_{k=0}^{\lfloor\frac{i+1}{2}\rfloor} \frac{k}{i}\binom{i-1}{k}\right]$$

$$= \begin{cases} \frac{1}{2^i+1}\binom{i}{\frac{i}{2}} & i \text{ even} \\ \frac{1}{2^i}\binom{i-1}{\frac{i-1}{2}} & i \text{ odd} \end{cases}$$

These last steps use the observation that summing half of a set of binomial coefficients gives roughly half of $2^i$:

$$\sum_{k=0}^{\lfloor\frac{i+1}{2}\rfloor} \binom{i}{k} = \begin{cases} 2^{i-1} & i \text{ odd} \\ 2^{i-1} - \frac{1}{2}\binom{i}{\frac{i}{2}} & i \text{ even} \end{cases}$$

At this point, note that for i even, we have that $\mathbb{E}[L_i]=\mathbb{E}[L_{i+1}]$. Thus, to bound $\mathbb{E}[L_i]$, it suffices to show that it is bounded for i even.

Finally, Sterling's factorial approximation, $$i! = \Omega\left(\sqrt{2\pi i}\left(\frac{i}{e}\right)\right),$$

is used to provide the desired bound:

$$\mathbb{E}[L_i] = \frac{1}{2^{i+1}}\binom{i}{\frac{i}{2}} = \Omega\left(\frac{\sqrt{2\pi i}\,(i/e)^i}{2^{i+1}\left(\sqrt{2\pi(i/2)}\left(\frac{i/2}{e}\right)^{i/2}\right)^2}\right)$$

$$= \Omega\left(\frac{(i/e)^i}{2^i\sqrt{2\pi i}\,\frac{1}{2^i}\left(\frac{i}{e}\right)^i}\right)$$

$$= \Omega\left(\frac{1}{\sqrt{2\pi}}i^{-0.5}\right)$$

J. Cited Documents

Each cited document is incorporated by reference herein in its entirety.

D. Amodei, R. Anubhai, E. Battenberg, C. Case, J. Casper, B. Catanzaro, J. Chen, M. Chrzanowski, A. Coates, G. Diamos, et al. Deep Speech 2: End-to-End Speech Recognition in English and Mandarin. In Proceedings of The International Conference on Machine Learning (ICML), pages 173-182, 2016.

M. Banko and E. Brill. Scaling to Very Very Large Corpora for Natural Language Disambiguation. In *Proceedings of Association of Computational Linguistics (ACL)*, January 2001.

E. Battenberg, J. Chen, R. Child, A. Coates, Y. Gaur, Y. Li, H. Liu, S. Satheesh, D. Seetapun, A. Sriram, and Z. Zhu. Exploring Neural Transducers for End-to-end Speech Recognition. arXiv preprint arXiv:1707.07413, 2017.

C. Chelba, T. Mikolov, M. Schuster, Q. Ge, T. Brants, P. Koehn, and T. Robinson. One Billion Word Benchmark for Measuring Progress in Statistical Language Modeling. arXiv preprint arXiv:1312.3005, 2013.

K. He, X. Zhang, S. Ren, and J. Sun. Deep Residual Learning for Image Recognition. In *Proceedings of the IEEE Conference on Computer Vision and Pattern Recognition (CVPR)*, pages 770-778, June 2016.

Joel Hestness, Sharan Narang, Newsha Ardalani, Gregory Diamos, Heewoo Jun, Hassan Kianinejad, Md. Mostofa Ali Patwary, Yang Yang, and Yanqi Zhou. 2017. Deep Learning Scaling is Predictable, Empirically. arXiv preprint arXiv:1712.00409 (2017).

M. Luong, E. Brevdo, and R. Zhao. Neural Machine Translation (seq2seq) Tutorial. https://github.com/tensorflow/nmt, 2017.

R. Jozefowicz O. Vinyals, M. Schuster, N. Shazeer, and Y. Wu. Exploring the Limits of Language Modeling. arXiv preprint arXiv:1602.02410v2, 2016.

O. Russakovsky, J. Deng, H. Su, J. Krause, S. Satheesh, S. Ma, Z. Huang, A. Karpathy, A. Khosla, M. Bernstein, A. C. Berg, and L. Fei-Fei. ImageNet Large Scale Visual Recognition Challenge. arXiv preprint arXiv:1409.0575, January 2015.

R. Sennrich, B. Haddow, and A. Birch. Neural Machine Translation of Rare Words with Subword Units. arXiv preprint arXiv:1508.07909, 2016.

Vapnik. An Overview of Statistical Learning Theory. In *IEEE Transactions on Neural Networks*, volume 10, pages 988-999, September 1998.

J. G Zilly, R. K. Srivastava, J. Koutník, and J. Schmidhuber. Recurrent Highway Networks. In *Proceedings of The International Conference on Machine Learning (ICML)*, 2017.

Anonymous, "A Proposed Hierarchy of Deep Learning Tasks," ICLR 2019 Conference Blind Submission, available at openreview.net/forum?id=B1g-X3RqKm.

K. Computing System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 19:
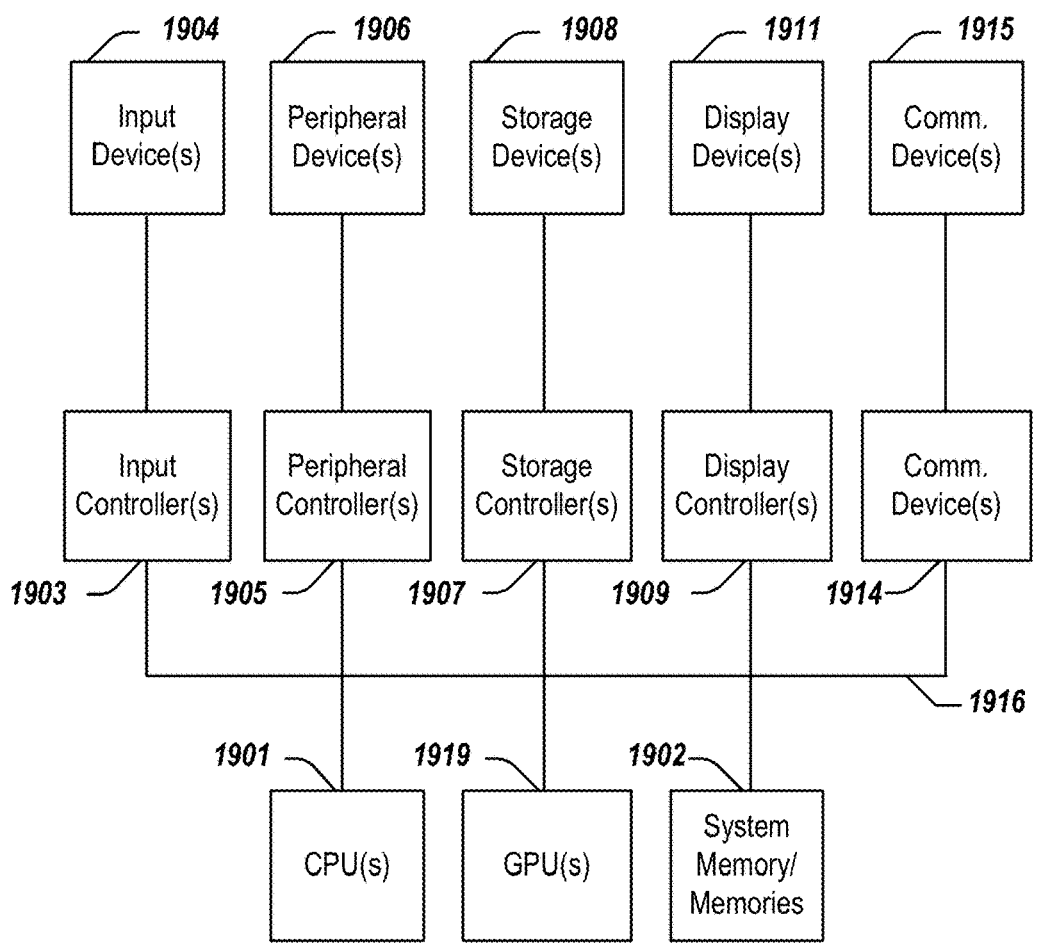
FIG. 19 depicts a simplified block diagram of a computing device/information handling system, in accordance with embodiments of the present document.

FIG. 19 depicts a simplified block diagram of a computing device/information handling system (or computing system) according to embodiments of the present disclosure. It will be understood that the functionalities shown for system 1900 may operate to support various embodiments of a computing system—although it shall be understood that a computing system may be differently configured and include different components, including having fewer or more components as depicted in FIG. 19.

As illustrated in FIG. 19, the computing system 1900 includes one or more central processing units (CPU) 1901 that provides computing resources and controls the computer. CPU 1901 may be implemented with a microprocessor or the like, and may also include one or more graphics processing units (GPU) 1919 and/or a floating-point coprocessor for mathematical computations. System 1900 may also include a system memory 1902, which may be in the form of random-access memory (RAM), read-only memory (ROM), or both.

A number of controllers and peripheral devices may also be provided, as shown in FIG. 19. An input controller 1903 represents an interface to various input device(s) 1904, such as a keyboard, mouse, touchscreen, and/or stylus. The computing system 1900 may also include a storage controller 1907 for interfacing with one or more storage devices 1908 each of which includes a storage medium such as magnetic tape or disk, or an optical medium that might be used to record programs of instructions for operating systems, utilities, and applications, which may include embodiments of programs that implement various aspects of the present disclosure. Storage device(s) 1908 may also be used to store processed data or data to be processed in accordance with the disclosure. The system 1900 may also include a display controller 1909 for providing an interface to a display device 1911, which may be a cathode ray tube (CRT), a thin film transistor (TFT) display, organic light-emitting diode, electroluminescent panel, plasma panel, or other type of display. The computing system 1900 may also include one or more peripheral controllers or interfaces 1905 for one or more peripherals 1906. Examples of peripherals may include one or more printers, scanners, input devices, output devices, sensors, and the like. A communications controller 1914 may interface with one or more communication devices 1915, which enables the system 1900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for generating a learning curve to aid in estimating a metric value for a deep learning model, the method comprising:
    splitting a data set into a set of shards such that sizes of the shards span multiple orders of magnitude;
    training a set of models on each shard from the set of shards, in which models within the set of models vary in architecture, hyperparameters, or both;
    using a validation set to identify a best model for each shard from among the set of models that have been trained, in which the best model for each shard has a validation accuracy that was highest for that shard;
    fitting a power-law learning curve model using the validation accuracies and corresponding shard sizes of the best models selected for the shards, in which the power-law learning curve model comprises a power-law region, which follows a small data region and which indicates that new training data provides information that helps improve performance of a model in a predictable manner as indicated by the power-law region of the power-law learning curve model; and
    given an output metric, using the power-law region of the fitted power-law learning curve to select a corresponding metric value for use in designing or training a deep learning model.

2. The computer-implemented method of claim 1 further comprising the step of randomly shuffling the data set to maximize likelihood that shards of the data set have similar data distribution to the data set.

3. The computer-implemented method of claim 1 wherein the step of splitting the data set into a set of shards such that the shard sizes span multiple orders of magnitude comprises splitting the data set into a set of shards such that the shard sizes span multiple orders of magnitude in steps of approximately twice a size of a prior shard's size.

4. The computer-implemented method of claim 1 wherein the selected metric value is improvement in accuracy for the deep learning model given an increase in training data set size for training the deep learning model.

5. The computer-implemented method of claim 1 wherein the selected metric value is one or more compute requirements for the deep learning model.

6. The computer-implemented method of claim 5 wherein a compute requirement for the deep learning model comprises a selected training data set size times a number of parameters of the deep learning model.

7. The computer-implemented method of claim 1 further comprising the step of using at least some of the data in the data set to form the validation set, in which none of the data in the validation set is shared with any of the shards.

8. A system for generating a learning curve to aid in predicting a metric value for a deep learning model, the system comprising:
   one or more processors; and
   a non-transitory computer-readable medium or media comprising one or more sequences of instructions which, when executed by at least one of the one or more processors, causes steps to be performed comprising:
      training a set of models on each shard from a set of shards in which the models from the set of models vary in architecture, hyperparameters, or both, and the set of shards having been generated such that a shard has a shard size and the shard sizes span multiple orders of magnitude;
      using a validation set to identify a best model for each shard from among the set of models that have been trained, in which the best model for each shard has a validation accuracy that was highest for that shard;
      fitting a power-law learning curve model using the validation accuracies and corresponding shard sizes of the best models selected for the shards, in which the power-law learning curve model comprises a power-law region, which follows a small data region and which indicates that new training data provides information that helps improve performance of a model in a predictable manner as indicated by the power-law region of the power-law learning curve model; and
      using the power-law region of the fitted power-law learning curve, to determine a metric value for use in designing or training a deep learning model.

9. The system of claim 8 wherein the set of shards are generated from a data set of training data and the non-transitory computer-readable medium or media further comprises one or more sequences of instructions which, when executed by at least one of the one or more processors, causes steps to be performed comprising:
   randomly shuffling the data set to maximize likelihood that shards of the data set have similar data distribution to the data set; and
   splitting the data set into a set of shards such that the shard sizes span multiple orders of magnitude.

10. The system of claim 9 wherein the step of splitting the data set into a set of shards such that the shard sizes span multiple orders of magnitude comprises splitting the data set into a set of shards such that the shard sizes span multiple orders of magnitude in steps of approximately twice a size of a prior shard's size.

11. The system of claim 9 wherein the non-transitory computer-readable medium or media further comprises one or more sequences of instructions which, when executed by at least one of the one or more processors, causes steps to be performed comprising:
   using at least some of the data in the data set to form the validation set, in which none of the data in the validation set is shared with any of the shards.

12. The system of claim 8 wherein the determined metric value is improvement in accuracy for the deep learning model given an increase in training data set size for training the deep learning model.

13. The system of claim 8 wherein the determined metric value is one or more compute requirements for the deep learning model.

14. The system of claim 13 wherein a compute requirement for the deep learning model comprises a determined training data set size times a number of parameters of the deep learning model.

15. A non-transitory computer-readable medium or media comprising one or more sequences of instructions which, when executed by at least one of the one or more processors processor, causes steps to be performed comprising:
   training a set of models on each shard from a set of shards in which the models from the set of models vary in architecture, hyperparameters, or both, and the set of shards having been generated such that a shard has a shard size and the shard sizes span multiple orders of magnitude;
   using a validation set to identify a best model for each shard from among the set of models that have been trained, in which the best model for each shard has a validation accuracy that was highest for that shard;
   fitting a power-law learning curve model using the validation accuracies and corresponding shard sizes of the best models selected for the shards, in which the power-law learning curve model comprises a power-law region, which follows a small data region and which indicates that new training data provides information that helps improve performance of a model in a predictable manner as indicated by the power-law region; and
   selecting, using the power-law region of the fitted power-law learning curve, a metric value for use in designing or training a deep learning model.

16. The non-transitory computer-readable medium or media of claim 15 wherein the set of shards are generated from a data set of training data and the non-transitory computer-readable medium or media further comprises one or more sequences of instructions which, when executed by the at least one processor, or more processors, causes steps to be performed comprising:
   randomly shuffling the data set to maximize likelihood that shards of the data set have similar data distribution to the data set; and
   splitting the data set into a set of shards such that the shard sizes span multiple orders of magnitude.

17. The non-transitory computer-readable medium or media of claim 16 wherein the step of splitting the data set into a set of shards such that the shard sizes span multiple orders of magnitude comprises splitting the data set into a set of shards such that the shard sizes span multiple orders of magnitude in steps of approximately twice a size of a prior shard's size.

18. The non-transitory computer-readable medium or media of claim 15 wherein the selected metric value is improvement in accuracy for the deep learning model given an increase in training data set size for training the deep learning model.

19. The non-transitory computer-readable medium or media of claim 15 wherein the selected metric value is one or more compute requirements for the deep learning model.

20. The non-transitory computer-readable medium or media of claim 15 wherein a compute requirement for the deep learning model comprises a selected training data set size times a number of parameters of the deep learning model.

* * * * *